United States Patent
Jemail

(10) Patent No.: US 11,096,384 B2
(45) Date of Patent: Aug. 24, 2021

(54) ENHANCED EQUINE TOOL

(71) Applicant: Christina Jemail, Erie, CO (US)

(72) Inventor: Christina Jemail, Erie, CO (US)

(73) Assignee: Christina Jemail, Erie, CO (US)

( * ) Notice: Subject to any disclaimer, the term of this patent is extended or adjusted under 35 U.S.C. 154(b) by 0 days.

(21) Appl. No.: 16/402,226

(22) Filed: May 2, 2019

(65) Prior Publication Data

US 2020/0229419 A1 Jul. 23, 2020

Related U.S. Application Data

(63) Continuation-in-part of application No. 14/600,005, filed on Jan. 19, 2015, now abandoned.

(51) Int. Cl.
*A01L 11/00* (2006.01)
*A01L 15/00* (2006.01)
*A01K 13/00* (2006.01)

(52) U.S. Cl.
CPC ............ *A01L 15/00* (2013.01); *A01K 13/001* (2013.01); *A01L 11/00* (2013.01)

(58) Field of Classification Search
CPC .......... A01L 11/00; A01L 15/00; B25G 3/02; B25G 3/10; B25G 3/12; A46B 15/0055; A46B 15/0081; A46B 2200/1093
USPC ..... 168/45–47, 48.1, 48.2; 119/612–15, 617; 15/105, 111–13; D4/116, 118
See application file for complete search history.

(56) References Cited

U.S. PATENT DOCUMENTS

| 544,540 | A | * | 8/1895 | Jones | A01L 11/00 168/45 |
| 567,493 | A | * | 9/1896 | McCartea | A01L 11/00 168/45 |
| 880,855 | A | * | 3/1908 | Barrell | F23J 3/026 15/104.066 |
| 1,522,029 | A | * | 1/1925 | Roberts | F16B 7/048 403/237 |

(Continued)

FOREIGN PATENT DOCUMENTS

| DE | 462935 C | * | 7/1928 | B25G 3/02 |
| DE | 3620846 A1 | * | 12/1987 | A46B 7/04 |
| DE | 102009014650 A1 | * | 10/2010 | A01L 11/00 |

OTHER PUBLICATIONS

English-language translation of DE 462935 (Year: 1928).*
English-language translation of DE 3620846 A1 (Year: 1987).*
English-language translation of DE 102009014650 A1 (Year: 2010).*

*Primary Examiner* — Lisa L Tsang

(57) ABSTRACT

An enhanced equine tool has an enhanced pick tool, an enhanced grip handle, and an interchangeable tool head. The pick tool extends through the handle and out one end, curves into a flex fulcrum, and then extends upwards to a pick tip. The handle has two finger stops and a tool mount that releasably mounts an interchangeable tool head. The tool head can be a collateral groove brush head, bale twine cutter head, etc. The collateral groove brush head is adapted to fit within the collateral groove of an equine hoof and provide enhanced cleaning. The V-shaped brush head also efficiently cleans the central groove of the frog and other areas. Together, the components of an enhanced equine tool provide a plethora of enhanced functionalities that allow the equine caregiver to efficiently clean the hoof and undertake other tasks as well.

20 Claims, 18 Drawing Sheets

(56) References Cited

U.S. PATENT DOCUMENTS

| | | | | | |
|---|---|---|---|---|---|
| 3,961,392 | A | * | 6/1976 | Young | A47L 11/205 15/105 |
| 4,367,798 | A | * | 1/1983 | Sabol | A01L 11/00 168/45 |
| D270,104 | S | * | 8/1983 | Jensen | 168/48.2 |
| 4,730,361 | A | * | 3/1988 | Koffler | A46B 9/023 132/120 |
| 5,168,935 | A | * | 12/1992 | Thornbury | A01L 11/00 168/48.1 |
| 5,960,745 | A | * | 10/1999 | Boyland | A01K 13/002 119/613 |
| 6,202,754 | B1 | * | 3/2001 | Luttrell | A01L 11/00 15/236.07 |
| D448,572 | S | * | 10/2001 | Gravlee | D30/158 |
| 7,877,842 | B2 | * | 2/2011 | Bagley | B25G 3/18 16/422 |
| 8,312,580 | B2 | * | 11/2012 | Lee | B26B 11/00 7/118 |
| 8,591,056 | B2 | * | 11/2013 | Glunz | A01L 15/00 362/119 |
| 9,302,384 | B2 | * | 4/2016 | Goddard | B60D 1/58 |
| 2006/0179986 | A1 | * | 8/2006 | Luber | A01L 11/00 83/142 |
| 2008/0087443 | A1 | * | 4/2008 | Jemail | A01L 11/00 168/48.1 |
| 2012/0199369 | A1 | * | 8/2012 | Taylor | A01L 15/00 168/48.1 |
| 2014/0103276 | A1 | * | 4/2014 | Fegan | B25D 1/04 254/26 R |
| 2020/0253183 | A1 | * | 8/2020 | Kerckhaert | A01L 11/00 |
| 2020/0267960 | A1 | * | 8/2020 | Moffett | A01L 11/00 |
| 2020/0288853 | A1 | * | 9/2020 | Siegman | B25G 3/12 |

* cited by examiner

ENHANCED EQUINE TOOL

CROSS-REFERENCE TO RELATED APPLICATIONS

This application claims the benefit of U.S. application Ser. No. 14/000,005 and filed on Jan. 19, 2015 which is specifically incorporated by reference herein for all that it discloses and teaches.

TECHNICAL FIELD

The present invention relates generally to the field of animal care; and more particularly, to an enhanced equine tool.

BACKGROUND

The field of art has known a variety of hand tools that assist the user in caring for animals, and in particular, equines. Specifically, there are a number of hoof pick type tools that can simplify the task of cleaning stones, debris, etc. from animal hooves. An equine, such as a horse, mule or donkey, has a hoof which can accumulate materials on the bottom and sides, and in particular, the sole and frog of the hoof. People tasked with caring for such animals must periodically (preferably, at least daily) clear said areas of any debris. This task also provides the caregiver with an opportunity to visually inspect the hooves—especially, the otherwise unseen portions including the sole and frog—for damage and/or injury. These are critical tasks, as lodged debris can lead to injury and a damaged hoof can be an easy point of entry for infection, disease, etc.

Many known hoof picks currently have a handle end and a pick end; with the pick usually extending outwards from the handle and either upwards, or even curving backwards towards the handle at an acute angle. Such designs provide limited leverage and require the user to apply excessive force, leading to a dangerous situation for both the user and the animal. This fact can be understood more clearly when the relative position of the user is considered while the hoof cleaning process is occurring: the caregiver is bent over and grasping the hoof/leg with one hand and holding it in position off the ground with the sole and frog turned upwards so that he or she can then clean the hoof with a hoof pick type tool held in the other hand. As the caregiver is thus bent over, straining to hold the hoof off the ground and in position to be cleaned, the equine is often leaning against the user (although this should not be tolerated, it does occur), and so the user can be put under significant strain even before he or she starts picking and prying at stones and other impacted debris in the hoof. Therefore, it is critical that the hoof pick be designed to most efficiently (with minimum effort and time) allow the user to complete the task.

During the cleaning process, the relatively sharp pick of typical hoof pick tools provides limited efficacy in completing the entire cleaning task. For example, although somewhat useful in prying stones and debris from the hoof, it has limited functionality in brushing the hoof clean. Although a very few hoof pick tools have been designed to address this problem, they simply attach a generic brush somewhere on the hoof pick tool and hope it suffices. Such brushes are not adapted to specifically address and clean the contours, grooves, etc. of an equine hoof and they are positioned on the handle in inefficient locations which can necessitate changing one's grip on the handle in order to put them to use. Such a maneuver can be difficult to accomplish while bent over and attempting to hold a hoof off the ground and in place for cleaning. If the tool is inadvertently dropped or it takes too long to maneuver it into place and effect a good cleaning, the hoof must often be set down while the user rests and recovers for another effort. This, of course, allows the hoof to get dirty and/or pick up new debris and otherwise frustrates the cleaning task.

Another factor that can lead to the tool being dropped is that many existing hoof picks have a straight-wall, hard, slick handle. Such tools are difficult to grasp comfortably and even more difficult to hang on to when significant force needs to be applied to clear debris.

What is needed is an enhanced equine tool which provides optimum gripping surfaces so that a user can easily grasp and hold the tool while employing force thereto and can continue to do so for relatively long periods without the tool slipping or being dropped. Additionally, an enhanced equine tool should provide for an efficient pick angle between (and including) ninety and one hundred and thirty five degrees. A properly shaped hoof brush that fits the specialized contours of equine hooves should be integrated onto an enhanced equine tool to allow quick and efficient deployment of a cleaning brush and easy swaps between picking and brushing without setting down and picking up different tools or changing hand positions. Interchangeable collateral groove brush heads and other tool heads should also be able to be swapped into an enhanced equine tool.

SUMMARY

One embodiment of the present invention comprises an enhanced equine tool that incorporates an enhanced pick tool, an enhanced grip handle, and an interchangeable tool head. The pick tool extends longitudinally through the handle and out one end before curving into a flex fulcrum and then extending upwards to a pick tip. The handle has two finger stops and an interchangeable tool mount that releasably mounts an interchangeable tool head. The tool head can be an interchangeable collateral groove brush head, a bale twine cutter head, etc. The collateral groove brush head is adapted to fit within the collateral groove and provide enhanced cleaning thereof. The V-shaped brush head also efficiently cleans the central groove of the frog, and the grooves between the shoe and the hoof.

Together, the components of an enhanced equine tool provide a plethora of enhanced functionalities that allow the equine caregiver to most efficiently undertake the hoof-cleaning process while also providing other uses for the same enhanced tool.

BRIEF DESCRIPTION OF THE DRAWINGS

The aforementioned and other features and objects of the present invention and the manner of attaining them will become more apparent and the invention itself will be best understood by reference to the following descriptions of a preferred embodiment and other embodiments taken in conjunction with the accompanying drawings, wherein.

DETAILED DESCRIPTION

Figure 1:
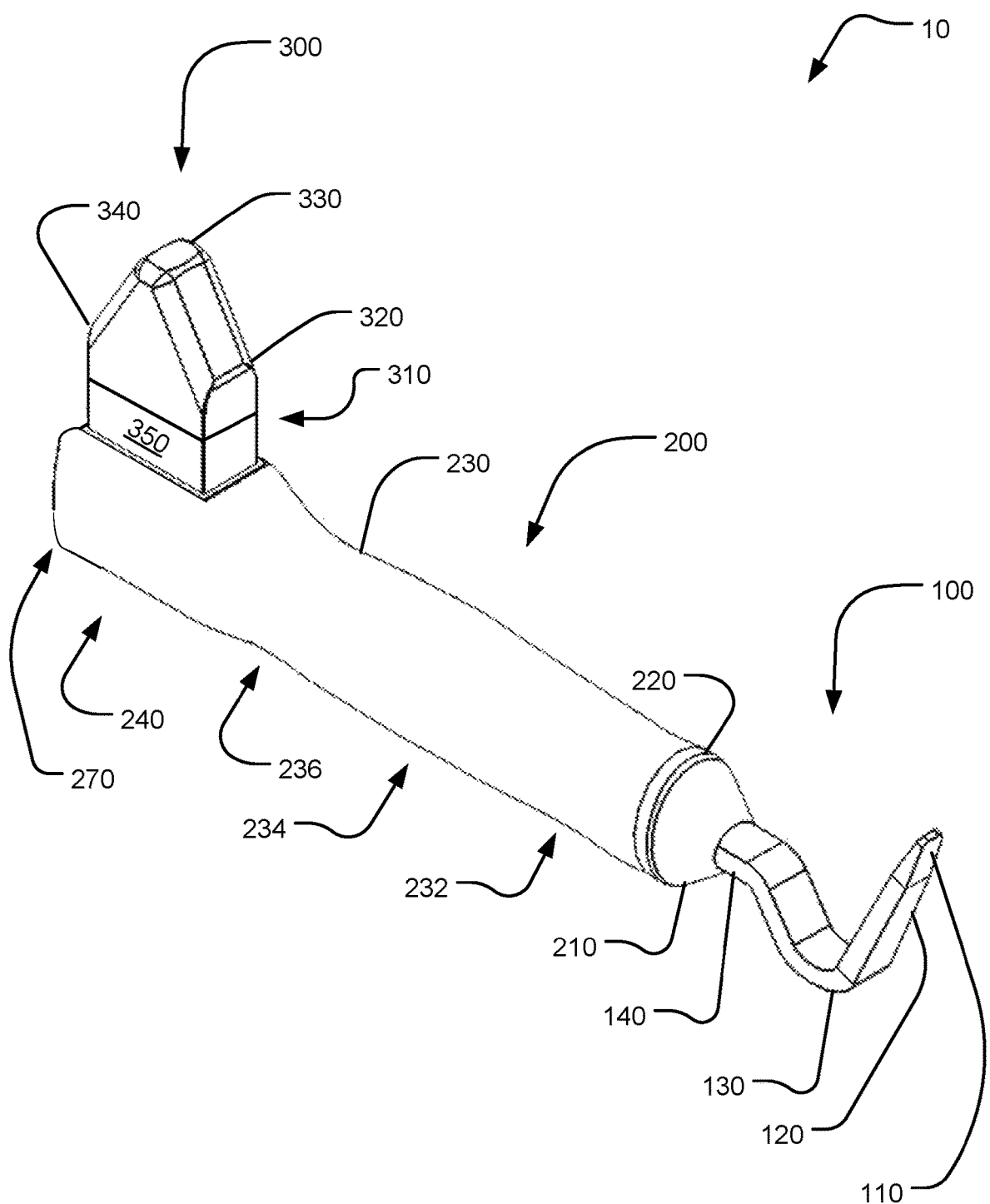
FIG. 1 illustrates a perspective view of an exemplary embodiment of an enhanced equine tool.

In the following discussion, numerous specific details are set forth to provide a thorough understanding of the present disclosure. However, those skilled in the art will appreciate that embodiments may be practiced without such specific details. Furthermore, lists and/or examples are often provided and should be interpreted as exemplary only and in no way limiting embodiments to only those examples.

Exemplary embodiments are described below in the accompanying Figures. The following detailed description provides a comprehensive review of the drawing Figures in order to provide a thorough understanding of, and an enabling description for, these embodiments. One having ordinary skill in the art will understand that in some cases, well-known structures and functions have not been shown or described in detail to avoid unnecessarily obscuring the descriptions of the embodiments.

Referring now to the drawings, FIG. 1 illustrates a perspective view of an exemplary embodiment of an enhanced equine tool 10. There are three primary sections of the enhanced equine tool illustrated in FIG. 1: the enhanced pick tool 100, the enhanced grip handle 200, and the interchangeable tool head 300.

The enhanced grip handle 200 comprises the center portion of the enhanced equine tool 10 and has attached thereto the enhanced pick tool 100 and the interchangeable tool head 300. The enhanced grip handle 200 extends longitudinally from a grip handle pick end to a grip handle interchangeable tool end. At the grip handle pick end, a pick transition piece 210 provides a transition from the relatively small outside perimeter of the extended horizontal attachment shaft 140 to the larger outside perimeter of the enhanced grip handle 200 at the transition ring 220. The angled pick transition piece 210 keeps mud and other debris from building up and becoming embedded around the area where the extended horizontal attachment shaft 140 enters the enhanced grip handle 200. The transition ring 220 attaches to the pick transition piece 210 and begins the grip portion of the grasp handle 230.

The transition ring 220 has a relatively large outside perimeter compared to that of the horizontal attachment shaft 140. It is important to note that the extended horizontal attachment shaft 140 may have a short cross section that is round, rectangular, ovoid, or any other suitable shape. Similarly, the transition ring 220 may have a cross section (taken perpendicular to the longitudinal length of the handle) that is round, rectangular, ovoid, or any other suitable shape). Regardless of the exact shape of these cross sections, the term "diameter" will be used to refer to the average distance (i.e., the average diameter) the outside surface lies from the interior center line of the component.

The grasp handle 230 extends longitudinally back from the transition ring 220 and initially decreases in diameter relative to the transition ring 220. This first portion of decreased diameter is the first finger stop 232 of the grasp handle 230. The first finger stop 232 has a decreased diameter relative to the transition ring 220 for at least two reasons. When the tool is being properly grasped in the user's hand, the user's first finger (or fourth finger, if held in the opposite direction) is wrapped around this portion of the grasp handle 230. Thus, the grasp handle is sized to fit within When the user presses forward with the tool 10, the finger is restrained from sliding forward by the increased diameter of the transition ring 220. Additionally, the reduced diameter of the first finger stop 232 provides an ergonomic grip area for the user's finger and enhances gripping control and comfort. The grasp handle 230 can be made from polypropylene, thermoplastic rubber, acrylonitrile butadiene styrene and/or any other suitably strong, pliant, and resilient material(s).

Continuing back along the grasp handle 230, the next portion encountered is the palm grasp 234. The palm grasp 234 has an increased diameter relative to the first finger stop 232 increasing to a maximum and then decreasing to transition to the reduced diameter of the second finger stop 236 which is the next portion of the grasp handle 230 encountered. This bulging shape of the palm grasp 234 helps the user to retain her or his grip on the tool 10 and provides better ergonomics to match the shape of a grasping hand.

The second finger stop 236 has a decreased diameter relative to the palm grasp 234 as well as to the interchangeable tool mount 240 (which is the next portion of the enhanced grip handle 200 encountered as you continue to traverse its length to the rear following the second finger stop 236). When the tool is being properly grasped in the user's hand, the user's fourth finger (or first finger, if held in the opposite direction) is wrapped around this portion of the grasp handle 230. When the user presses forward with the tool 10, the finger is restrained from sliding forward by the increased diameter of the palm grasp 234. Similarly, when the user pulls backwards with the tool 10, the finger is restrained from sliding backward by the increased diameter of the interchangeable tool mount 240. Additionally, the reduced diameter of the second finger stop 236 provides an ergonomic grip area for the user's finger and enhances gripping control and comfort.

Figure 11:
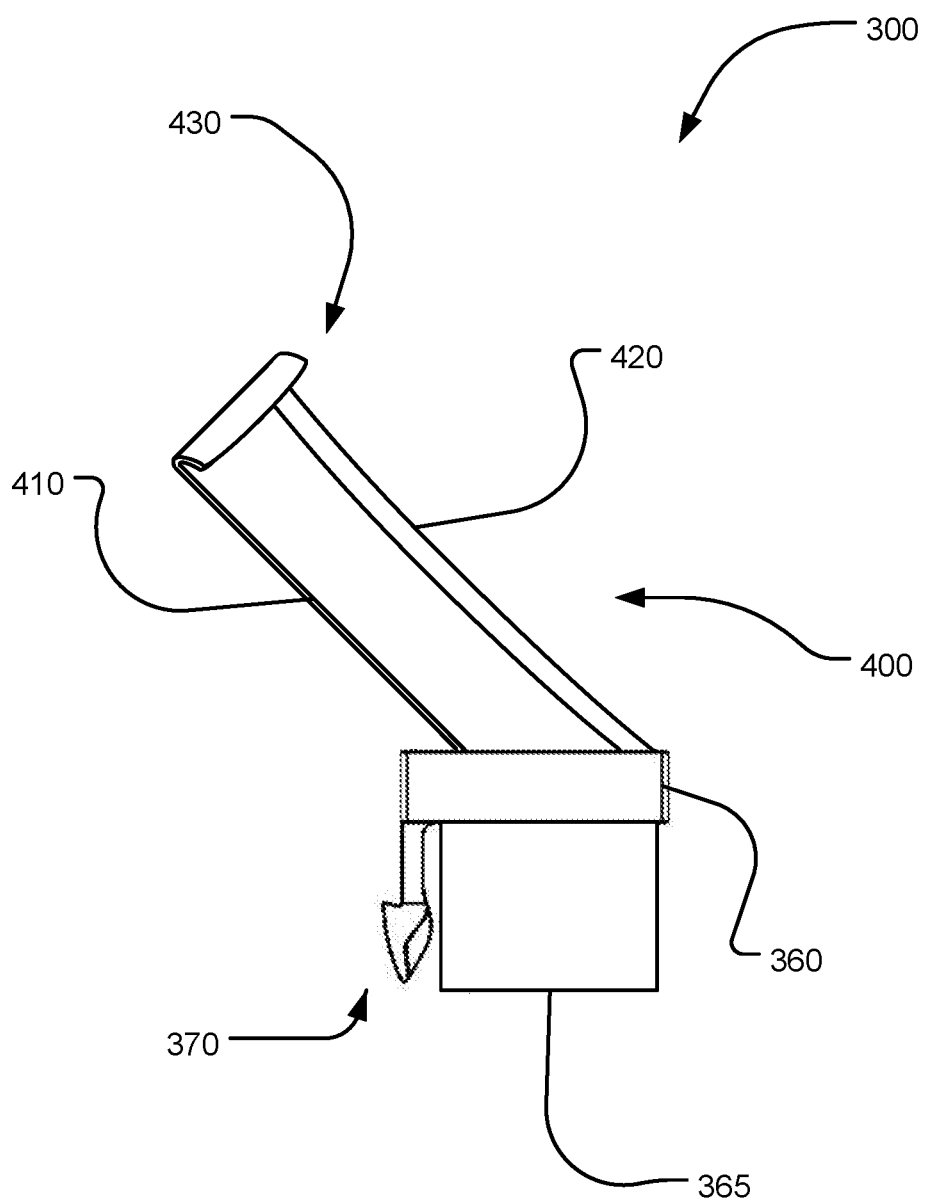
FIG. 11 illustrates a side elevation view of an interchangeable tool head comprising a hoof knife angle mounted on a standard tool head base for an exemplary embodiment of an enhanced equine tool.

The interchangeable tool mount 240 comprises a portion of the enhanced grip handle 200. FIG. 1 illustrates an interchangeable collateral groove brush head 310 seated within the interchangeable tool mount 240. In other embodiments, other interchangeable tool heads 300 are contemplated. For example, see FIG. 11 illustrating a twine cutter head 312. Whichever interchangeable tool head 300 is utilized, the interchangeable tool mount 240 receives and supports the tool head 300. The interchangeable tool mount lock 270 provides a means for releasably locking the interchangeable tool head 300 into the interchangeable tool mount 240.

The enhanced pick tool 100 extends outwards from the pick transition piece 210 of the enhanced grip handle 200. As illustrated in FIG. 1, the horizontal attachment shaft 140 extends longitudinally from the transition piece 210 before curving downwards to form the flex fulcrum 130. The pick tool 100 continues upwards from the flex fulcrum 130 through the pick extension 120 before terminating at the pick tip 110. In one embodiment, the pick extension 120 extends at an obtuse angle relative to the horizontal attachment shaft 140. There is a significant strength advantage to having the extended horizontal attachment shaft 140 extend horizontally within a large portion of the handle before exiting straight out horizontally from the end of the handle, versus having the shaft extend perpendicular out of the handle before curving to a pick tip.

The pick tip 110 comes to a point at the end. In one embodiment, the pick tip 100 does not comprise a sharp point such as an ice pick or knife blade. Instead, the pick tip 110 can be formed to approximate a flat bladed screwdriver tip. The pick extension 120 allows the pick tip 110 to be a distance from the flex fulcrum 130 such that the pick tip 110 extends past the grip handle's central horizontal longitudinal axis. In this way, the flex fulcrum 130 can act as a fulcrum when prying debris out of the hoof using the pick tip 110. The shape of the flex fulcrum 130 is adapted so that the leverage advantages of the pick tool 100 are maximized and the user can employ the enhanced equine tool 10 in a most efficient manner without requiring undue effort and strain. Furthermore, the curved shape of the flex fulcrum 130 allows the flex fulcrum 130 to resiliently flex (i.e., to flex somewhat without permanently deforming, resilient flexing requires that the flex fulcrum return to it's shape automatically after experiencing a load) when placed under load, helping the pick tool 100 to be strong and withstand great forces without breaking. In one embodiment, the flex fulcrum 130 is adapted to complexly curve downwards from the horizontal of the extended horizontal attachment shaft 140 and then transition to extend back through the horizontal before curving upwards to join the pick extension 120.

Figure 8:
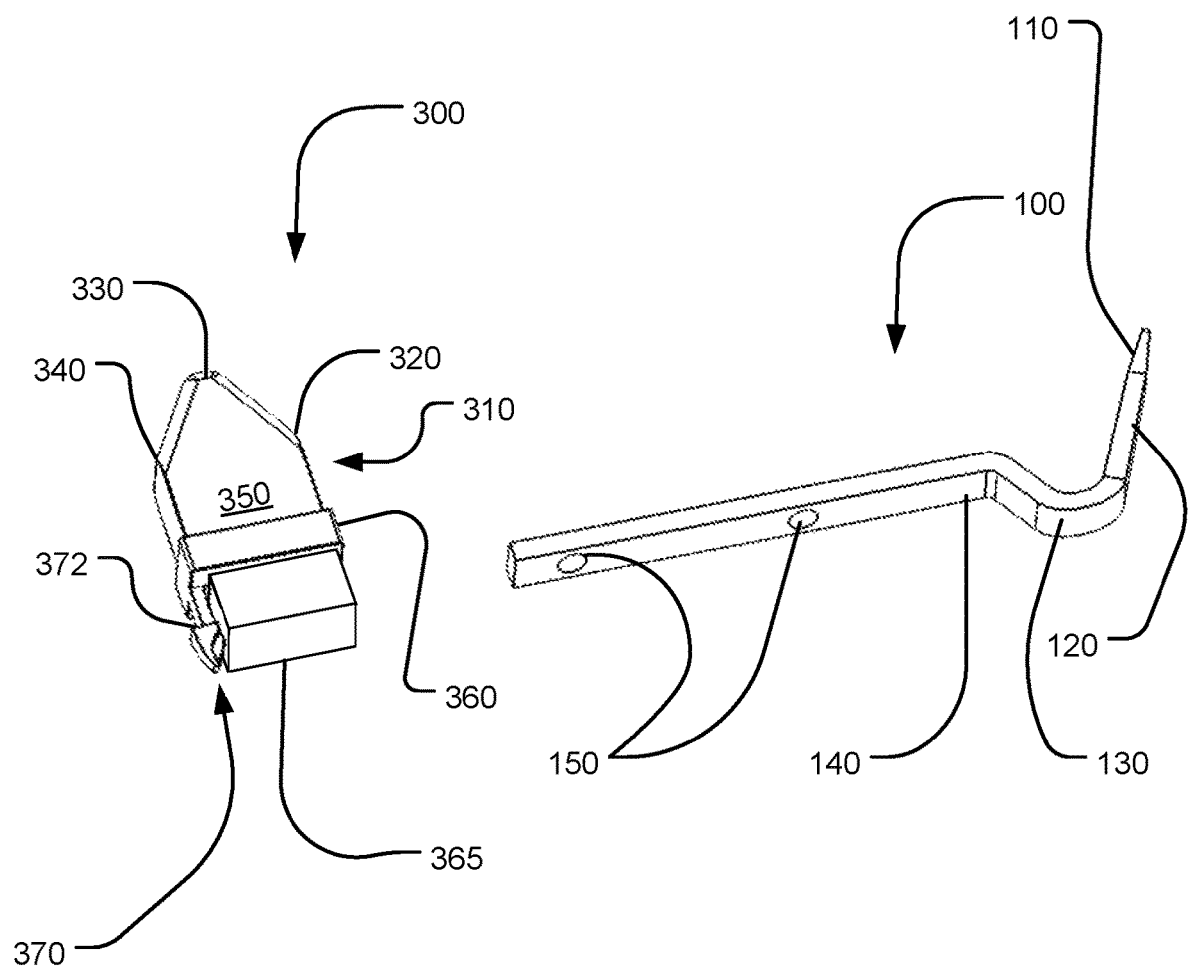
FIG. 8 illustrates a perspective view of an interchangeable collateral groove brush head and enhanced hoof pick of an exemplary embodiment of an enhanced equine tool.

Although not illustrated in FIG. 1, the extended horizontal attachment shaft 140 extends longitudinally into the enhanced grip handle 200 (see FIG. 8 for a view of an exemplary extended horizontal attachment shaft 140). The enhanced grip handle 200 can be formed or molded directly onto the extended horizontal attachment shaft 140. In another embodiment, the shaft 140 and grip handle 200 can be formed together as one solid piece of metal (or similarly strong yet somewhat flexible material). In one embodiment, the pick tool 100 can be formed from a solid piece of metal and the grip handle 200 can be securely formed around the pick tool 100 in order to enhance the grasping and holding qualities of the grip handle 200 without reducing the strength of the underlying pick tool 100 itself. In another embodiment two holes 150 are formed in the extended horizontal attachment shaft the holes are used to secure the enhanced grip handle 200. The metal can be stainless steel, hardened or heat-treated steel, low carbon steel, titanium, or other similarly hard, strong and resilient material(s). Furthermore, the pick tip 110 can be pressed (or otherwise enhanced) to increase the strength and integrity of the pick tool 100.

The combination of the extended horizontal attachment shaft 140, the complexly curved flex fulcrum 130, the obtusely angled pick extension 120 and the pick tip 100 cause the pick tool 100 to be easier on the person cleaning debris from a hoof: less effort and strain are required and the user can see all three of the tool, hoof, and debris during the cleaning process. This makes it safer and easier to clean the hoof. Hoof picks that extend less than ninety degrees up from the handle (i.e., at an acute angle) can cause the handle of the tool or the person's own hand to partially block the user's view of the debris and hoof.

FIG. 1 illustrates an interchangeable collateral groove brush head 310 seated within the interchangeable tool mount 240. The brush head 310 comprises a plurality of brush bristles. As the plurality can be of varying bristle sizes, the bristles are not individually illustrated in the drawing FIGs. The bristle bases 350 are attached to the tool head base 360 (not visible in FIG. 1, see FIG. 8). The tool head base 360 is adapted to fit well within the interchangeable tool mount 240 so that the tool mount 240 holds and securely supports the tool head base 360. The top of the plurality of bristles of the interchangeable collateral groove brush head 310 are uniquely shaped to efficiently clean an equine hoof. For instance, the front-most bristles 320 (those closest to the pick tool 100) are shorter than the centermost bristles 330. Similarly, the back-most bristles 340 (those furthest from the pick tool 100) are shorter than the centermost bristles 330. As the plurality of bristles smoothly transition in height from the shorter front-most bristles 320 to the longer centermost bristles 330 and back to the shorter back-most bristles 340, the working ends of the bristles (those visible in FIG. 1) together form a V-shape bristle brush head. This V-shaped brush head is designed to fit within the V-shaped frog of the horse's hoof as well as within the V-shaped collateral groove between the hoof wall and the frog. These V-shaped recesses within the horse's hoof need to be cleaned out and the V-shaped bristle brush head 310 is adapted to most efficiently and quickly clean out these areas. A straight brush does not work as well in cleaning the frog, sole, and grooves.

In one embodiment, the plurality of bristles are fairly stiff and may be made from plastic, boar bristles, etc. In another embodiment, some or all of the plurality of bristles may be steel or other metal(s). In yet another embodiment, a combination of plastic and metal bristles is utilized. It is important to understand that the stiff, coarse bristles that are useful for cleaning hooves are very different from those useful in currying or grooming a horse and so a horse grooming brush, having completely the wrong shape and size bristles for cleaning hooves, also has the wrong type of bristles as well.

Figure 2:
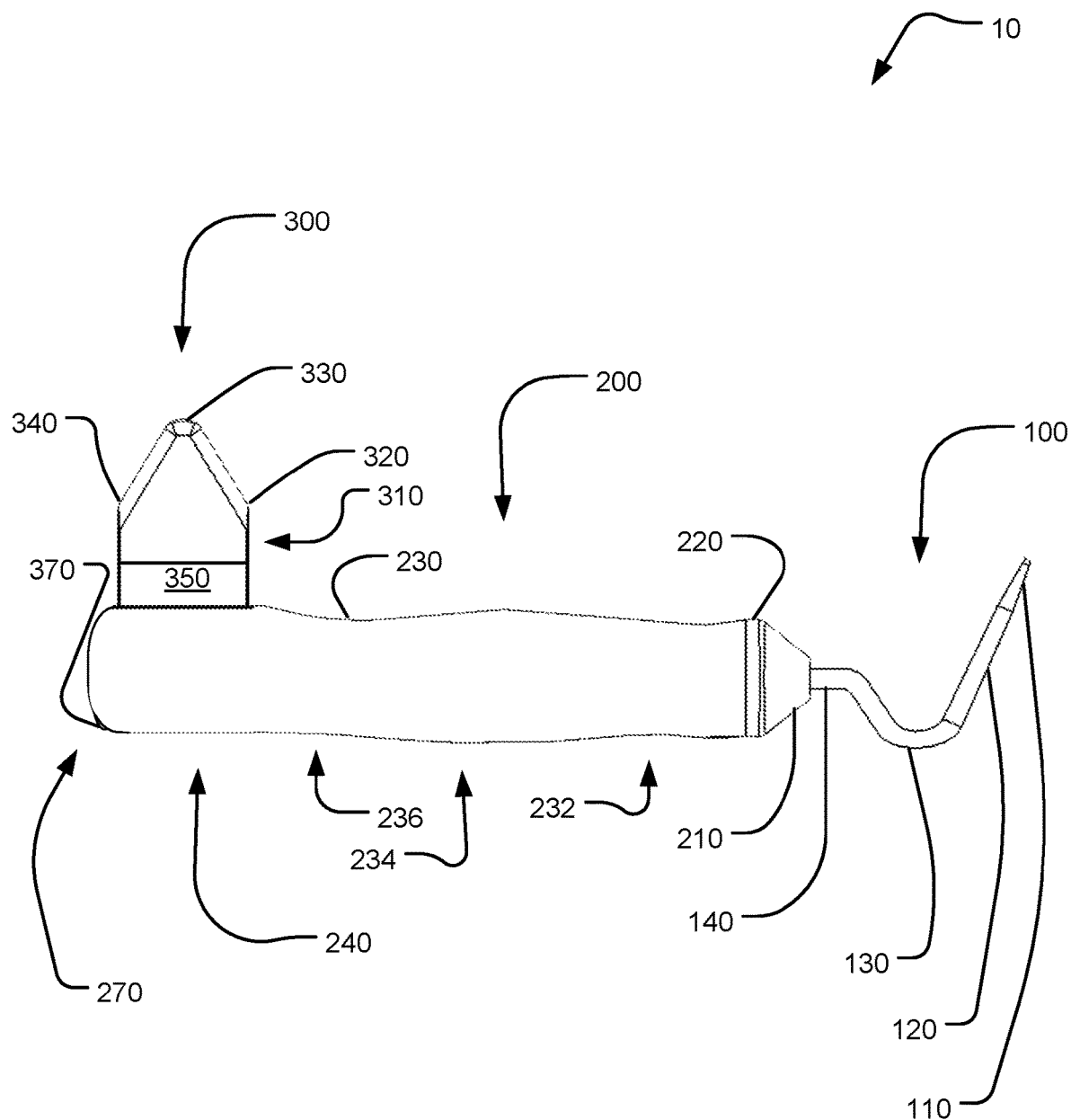
FIG. 2 illustrates a right side elevation view of an exemplary embodiment of an enhanced equine tool.

FIG. 2 illustrates a right side elevation view of an exemplary embodiment of an enhanced equine tool 10. The various components described in FIG. 1 are also shown in FIG. 2, with the change in viewing angle helping to illustrate the relative shapes and positions of said components. FIG. 2 also introduces locking catch 370. This locking catch 370 is a portion of the interchangeable tool head 300 that fits down inside the interchangeable tool mount 240 and extends into the interchangeable tool mount lock 270 portion. As can be seen more clearly in FIG. 8, the locking catch 370 has a lip or catch portion that extends towards the rear of the enhanced equine tool 10 (away from the pick tool 100) and engages a portion of the interchangeable tool mount lock 270 to retain the interchangeable tool head 300 inside the interchangeable tool mount 240. A user simply pushes the locking catch 370 frontwards, towards the pick tool 100, to push the lip/catch portion off of the interchangeable tool mount lock 270 and then the entire interchangeable tool head 300 can be lifted out of the tool mount 240. Similarly, by slightly compressing the locking catch 370 frontwards, the locking catch 370 and tool head base 360 can be slid down into the opening of the tool mount 240 and when the locking catch 370 reaches the interchangeable tool mount lock 270, it springs back into place, effectively engaging the lip of the locking catch 370 on the tool mount lock 270 and holding the tool head 300 in place within the tool mount 240. In other embodiments, other types of interchangeable tool mount locks 270 are contemplated.

Figure 3:
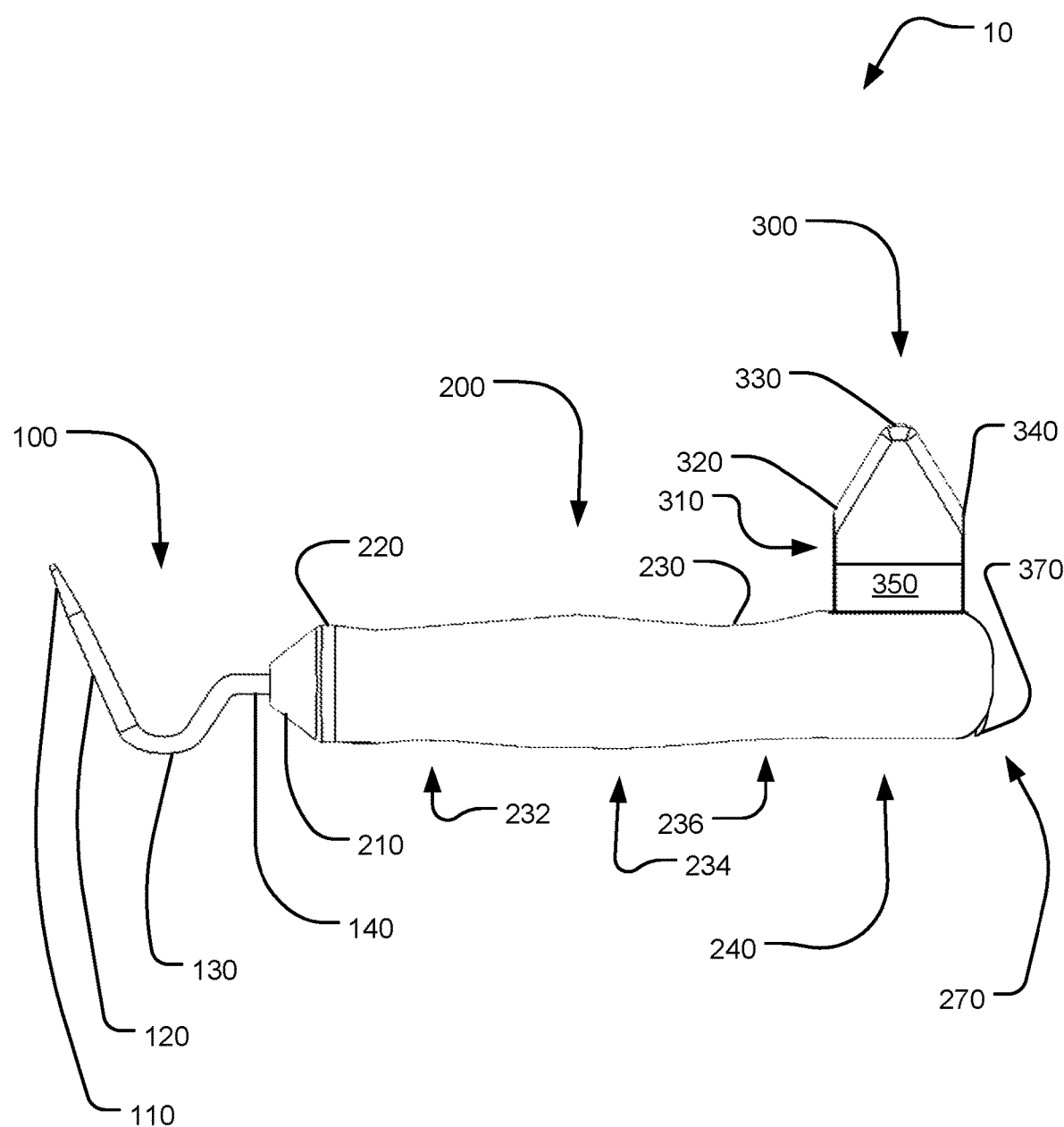
FIG. 3 illustrates a left side elevation view of an exemplary embodiment of an enhanced equine tool.

FIG. 3 illustrates a left side elevation view of an exemplary embodiment of an enhanced equine tool 10. In this view, the somewhat flattened "S" shape of the complexly curved flex fulcrum 130 can be seen. It is useful to point out that the working end of the pick tip 110 extends upwards from the enhanced grip handle 200 as does the working end of the interchangeable tool head 300. The placement of both working ends on the same, upwards side of the enhanced equine tool 10 greatly enhances the efficiency of the tool 10 as the user does not need to change grips on the tool 10 to go from picking the hoof to brushing the hoof. This is critical when the hoof cleaning job must be done quickly and the user's other hand is busy holding the hoof off the ground and in place. Attempting to switch grips on the tool 10 when the other hand is heavily engaged can lead to the tool 10 being dropped which can then derail the entire cleaning process.

In one embodiment the tool 10 is grasped so that the pick tip 110 is pointing away from the body of the user and also pointing down. The interchangeable collateral groove brush head 310 is therefore also pointed down. The user can then pick the hoof clean of debris with the pick and then slide the tool forwards and engage the brush head to further clean the hoof. The user can switch back and forth between the two working ends without changing the position or grip of his or her hand on the tool 10.

Figure 4:
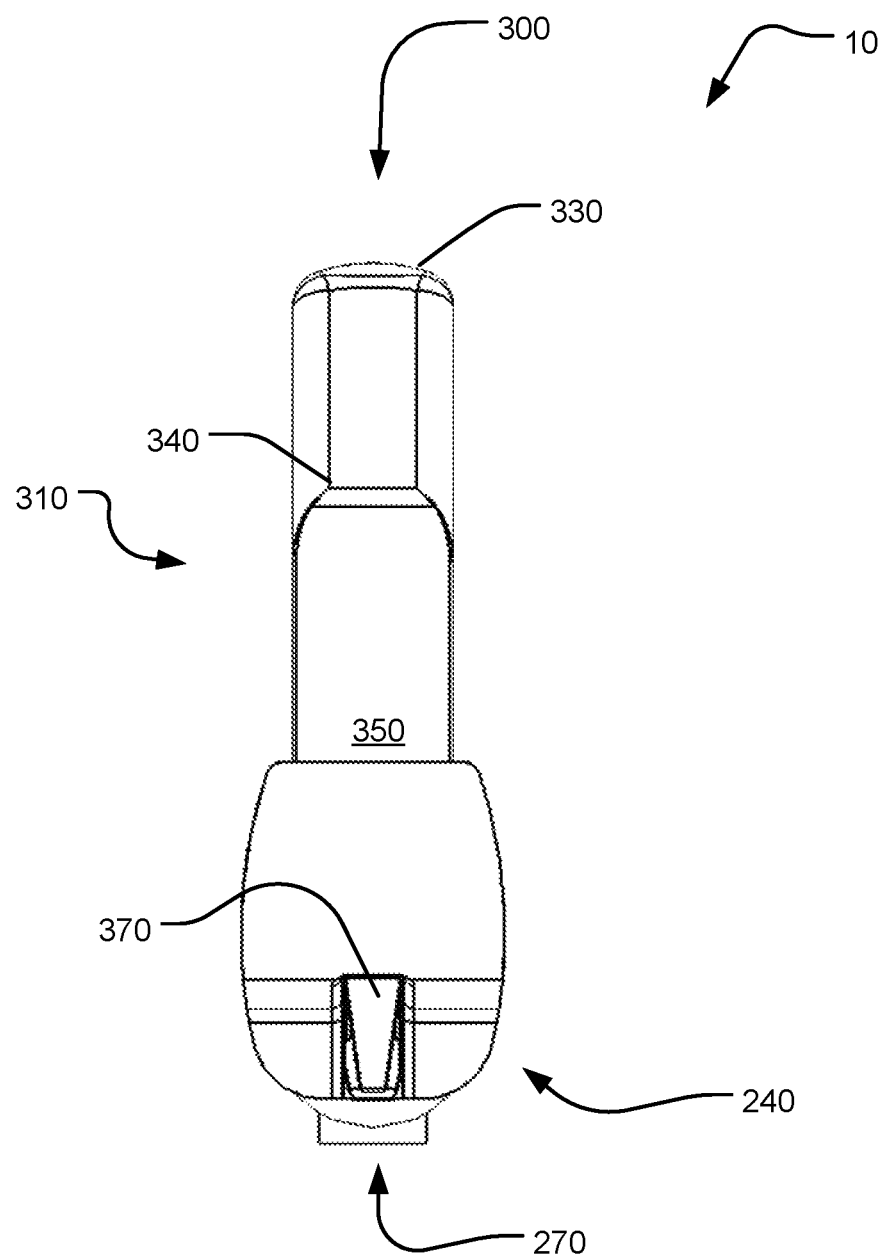
FIG. 4 illustrates a tool end elevation view of an exemplary embodiment of an enhanced equine tool.

FIG. 4 illustrates a tool end elevation view of an exemplary embodiment of an enhanced equine tool 10. The interchangeable tool head 300 is visible in this view, while the pick tool 100 is blocked from view (see FIG. 5 for the alternate view). In this illustration, it is easy to see the bristle bases 350 and the plurality of bristles extending upwards therefrom. From this view, only the rear-most bristles 340 through the centermost bristles 330 are visible. Note the transition in bristle height from the relatively short bristles that make up the rear-most bristles 340 to the tallest centermost bristles 330. These form half of the V-shape that is so important to efficiently cleaning the v-shaped grooves in an equine hoof.

Figure 5:
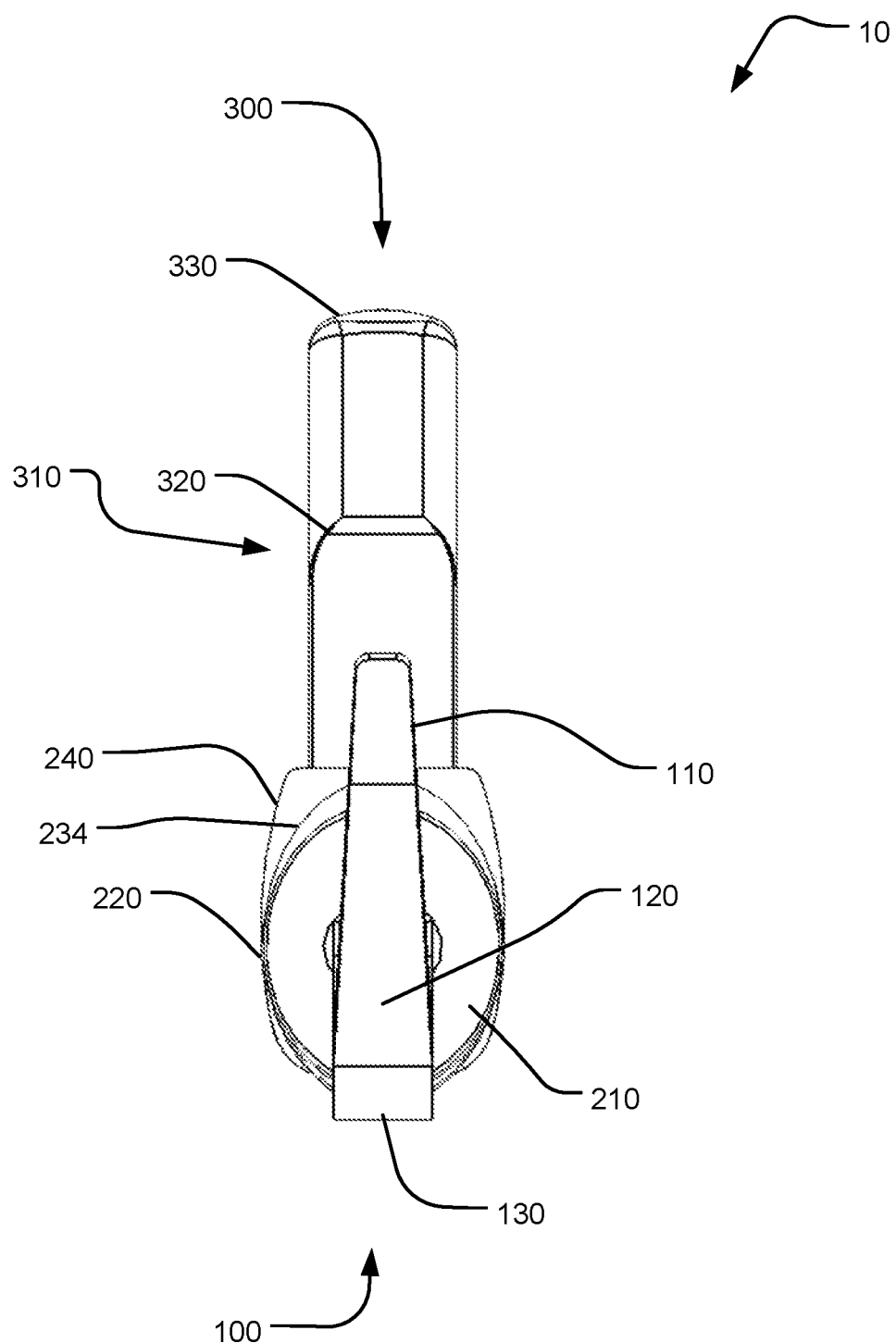
FIG. 5 illustrates a pick end elevation view of an exemplary embodiment of an enhanced equine tool.

FIG. 5 illustrates a pick end elevation view of an exemplary embodiment of an enhanced equine tool 10. As discussed above, this view makes it obvious that the working ends of both the pick tool 100 and the interchangeable tool head 300 extend upwards from the handle.

Figure 6:
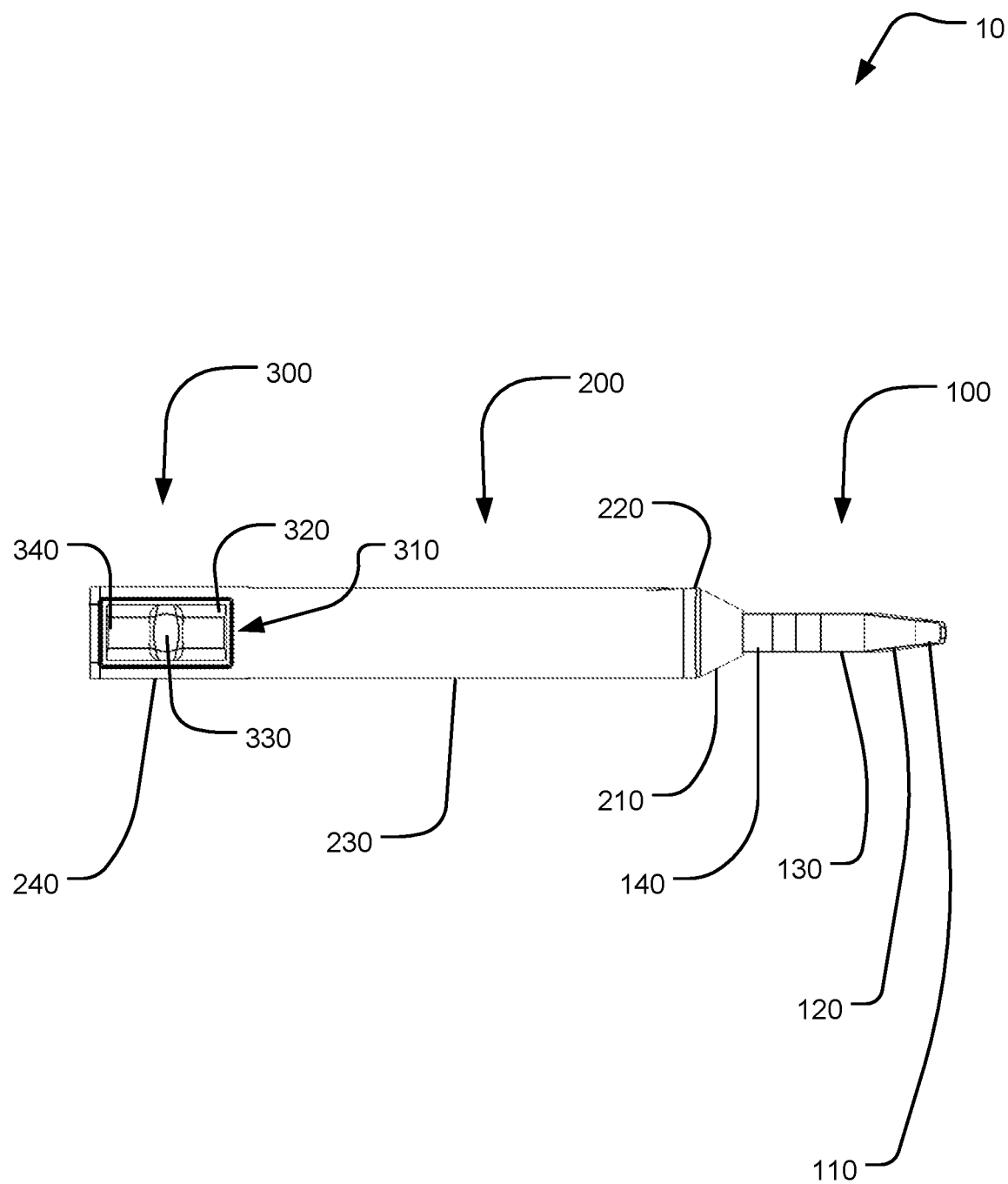
FIG. 6 illustrates a top plan view of an exemplary embodiment of an enhanced equine tool.

FIG. 6 illustrates a top plan view of an exemplary embodiment of an enhanced equine tool 10. The interchangeable tool head 300 is shown in place down inside the receiving port of the interchangeable tool mount 240.

Figure 7:
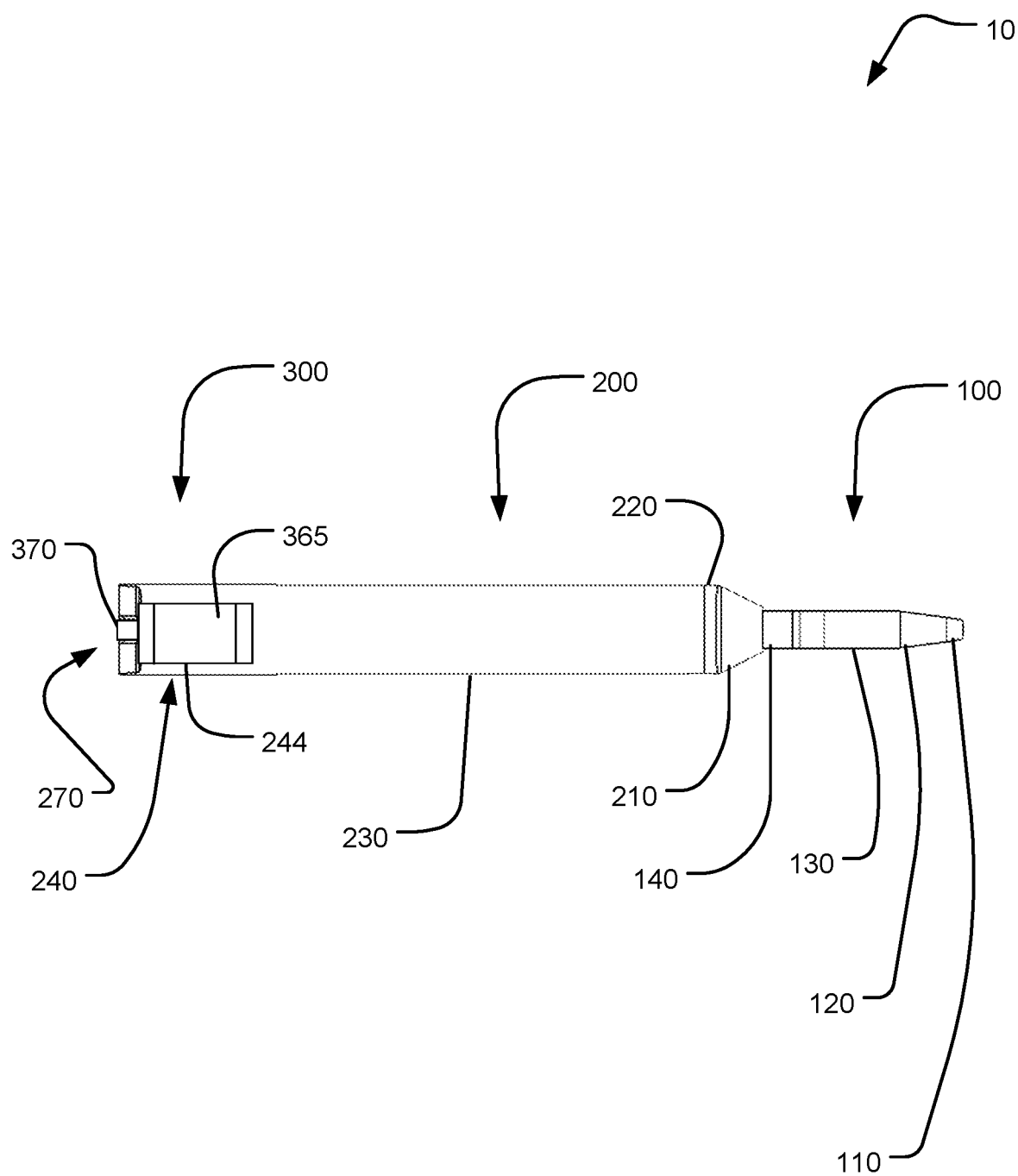
FIG. 7 illustrates a bottom plan view of an exemplary embodiment of an enhanced equine tool.

FIG. 7 illustrates a bottom plan view of an exemplary embodiment of an enhanced equine tool 10. In the embodiment illustrated in FIG. 7, the interchangeable tool mount 240 is shown with an open bottom slot 244. The interchangeable tool head support pylon 365 is visible through the open bottom slot 244. In other embodiments, the open slot 244 is sealed over and the support pylon 365 would not be visible. The locking catch 370 is shown in its latched position over the locking shelf in the interchangeable tool mount lock 270. By pressing the locking catch 370 forwards towards the pick tool 100, it disengages from the locking shelf in the tool mount lock 270 and allows the entire interchangeable tool head 300 to be removed from the enhanced equine tool 10 (see FIG. 8 showing the removed tool head 300).

FIG. 8 illustrates a perspective view of an interchangeable collateral groove brush head 310 and enhanced pick tool 100 of an exemplary embodiment of an enhanced equine tool are shown without the enhanced grip handle 200. In this view, the interchangeable tool head support pylon 365 is completely visible as is the locking catch 370. Note the pronounced locking lip 372 on the locking catch 370 for releasably engaging the locking shelf on the tool mount lock 270. Also, note how the interchangeable tool head support pylon 365 provides a strong support structure for snugly engaging within the bottom slot 244 of the interchangeable tool mount 240 (see FIG. 9, item 244).

Also, there is a large advantage to having a stiff brush as part of the combined single tool so that dirt and grit can be removed from the hoof before applying the knife tool. If you don't do this you can chip or otherwise dull the blade. Thus, with the pick, brush and knife it is three tools in one: a user can clean out large debris from the hoof with the pick, brush out remaining dirt, and then trim the hoof with the knife all without putting down the hoof, switching tools, etc.

Figure 9:
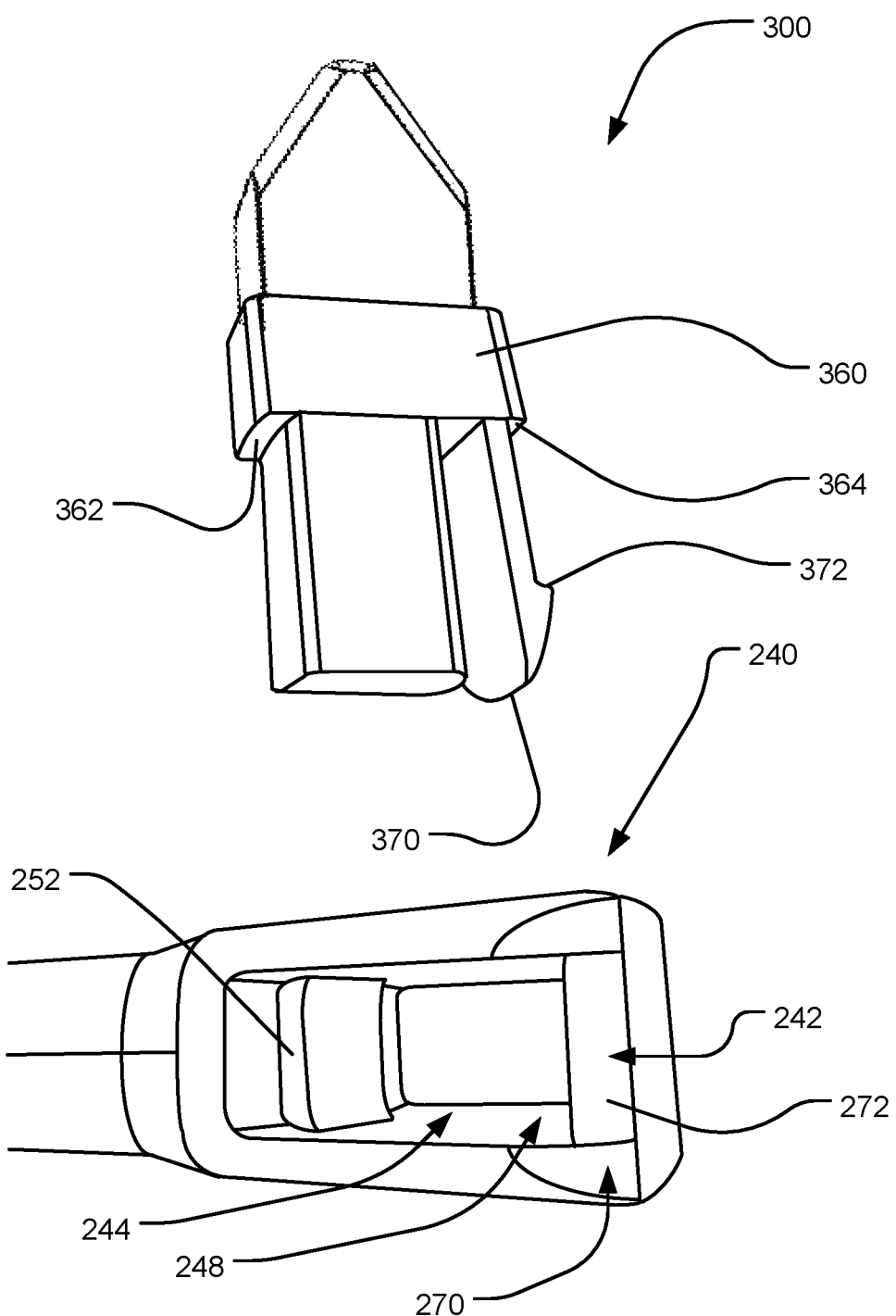
FIG. 9 illustrates a top perspective view of an interchangeable tool mount in an exemplary embodiment of an enhanced equine tool with an interchangeable tool about to be inserted into the tool mount.

FIG. 9 illustrates a top perspective view of an interchangeable tool mount 240 in an exemplary embodiment of an enhanced equine tool 10 with an interchangeable tool 300 about to be inserted into the tool mount 240. The tool mount 240 includes a tool port 242 and a bottom slot 244 which snugly receive therein corresponding components on the interchangeable tool heads 300. The shape of the tool port 242 matches that of the tool head base 360 such that individual interchangeable tool heads 300 can securely fit within the tool port 242. Also, the bottom slot 244 extends downwards, further into the tool mount 240 and provides a strong support structure which can receive therein and surround the interchangeable tool head support pylon 365 of an interchangeable tool head 300 (see FIG. 8).

Next to the bottom slot 244 is the receiving port 248 for the locking catch 370. The locking catch 370 slides down into the receiving port 248 with the catch 370 slightly compressed forward towards the support pylon 365. When the locking catch 370 clears the locking shelf 272 in the interchangeable tool mount lock 270, it springs rearward automatically and the locking lip 372 on the catch 370 engages the shelf 272, locking the tool head 300 into the tool mount 240.

The bottom surfaces of the tool head base 360 include a forward rest 362 and a rearward rest 364. The forward rest 362 is positioned above and rests upon the forward shelf 252 when the tool head base 360 is locked in place within the tool mount 240. Similarly, the rearward rest 364 is positioned above and rests upon the locking shelf 272 when the tool head base 360 is locked in place within the tool mount 240. In the embodiment illustrated in FIG. 9, the tool mount 240 extends completely through the handle 200 such that the interchangeable tool heads 300 can be locked in from the bottom or from the top. In such a scenario, consider the mirror image of the tool mount 240 wherein the locking shelf has an upper locking shelf 272 as shown in FIG. 9, and a lower locking shelf 273 which is the mirror image on the underside of the tool mount 240 (not visible in FIG. 9, but a mirror image of the upper locking shelf 272). Similarly, the forward shelf has an upper forward shelf 252 as shown in FIG. 9, and a lower forward shelf 253 which is the mirror image on the underside of the tool mount 240 (again, not visible in FIG. 9, but a mirror image of the upper forward shelf 252). In this embodiment, the interchangeable tool head 300 can be inserted from the top and the surfaces 362 and 364 rest on 252 and 272, respectively; or, the tool head 300 can be inserted from the bottom and the surfaces 362 and 364 rest on 253 and 273, respectively.

In FIG. 9, the bottom slot 244 and the receiving port 248 are illustrated and the locking shelf 272 is visible as part of the interchangeable tool mount lock 270. The locking catch 370 can be pressed forward, thereby releasing the locking lip 372 (see FIG. 8) of the locking catch 370 from the locking shelf 272 so that the entire interchangeable tool head 300 can be removed from the interchangeable tool mount 240.

Figure 10:
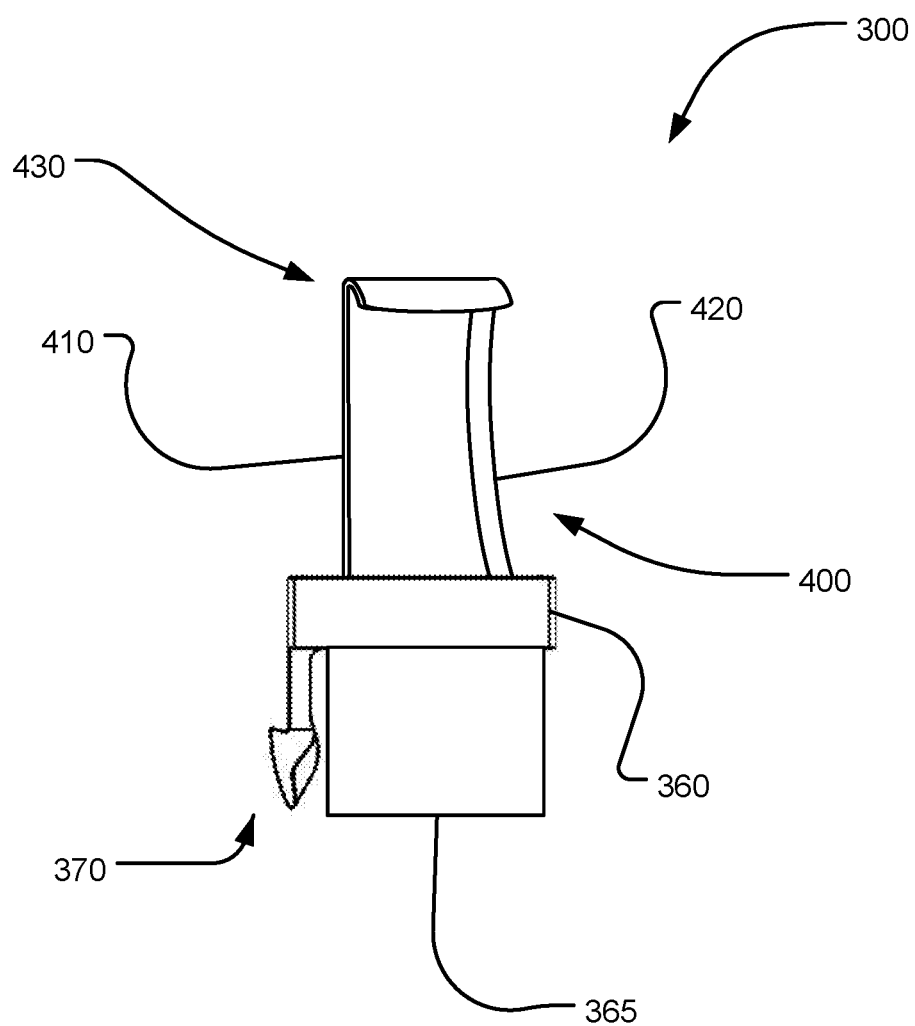
FIG. 10 illustrates a side elevation view of an interchangeable tool head comprising a hoof knife mounted on a standard tool head base in an exemplary embodiment of an enhanced equine tool.

FIG. 10 illustrates a side elevation view of an interchangeable tool head 300, in this embodiment, the interchangeable tool head comprises a hoof knife 400 mounted on the standard tool head base 360. This is an example of another interchangeable tool head 300 that can be used in place of the brush head 310. It is important to understand that as the tool heads 300 wear out, are broken, become lost, etc., they can be quickly and easily replaced in the enhanced equine tool. Furthermore, because the tool heads 300 are modular, they can be easily swapped with future tool heads as they are developed.

In the embodiment shown in FIG. 10, the hoof knife 400 has a straight knife spine 410 and a curved cutting blade 420. The hoof knife distal end 430 is curved and shaped into a hook so as to better access and trim portions of an equine hoof. In other embodiment, other forms/shapes/curvatures for the hoof knife 400 are contemplated. Also note that in this embodiment, the hoof knife 400 extends approximately vertically up from the tool head base 360, in other embodiments, other blade configurations are contemplated.

The hoof knife can be used to trim the frog, the frog groove, the bars, cut along the sulcus groove, trim the corners of the frog and open the rear of the frog grooves to prevent dirt from packing into them (cutting out the corners of the frog at the back of the grooves can make a big difference from keeping the frogs from packing dirt.) Also, if there are dark streaks or spots of fungal infection in the bars, you can use the hook to pare those areas out as they can otherwise promote abscesses. Note that in other embodiments, the entire knife blade is shaped into a loop rather than having just a hook at the distal end.

FIG. 11 illustrates a side elevation view of an interchangeable tool head 300 comprising a hoof knife 400 angle mounted on the standard tool head base 360. This is an example of another interchangeable tool head 300 that can be used in place of the brush head 310. In the embodiment shown in FIG. 11, the hoof knife 400 has a straight knife spine 410 and a curved cutting blade 420. The hoof knife distal end 430 is curved and shaped so as to better access and trim portions of an equine hoof. In other embodiments, other forms/shapes/curvatures for the hoof knife 400 are contemplated.

Note that in this embodiment, the hoof knife 400 extends upward from the tool head base 360 at an angle. This angle can be particularly useful for certain cutting tasks and may be preferred by various users over the more vertical blade configuration shown in FIG. 10.

Figure 12:
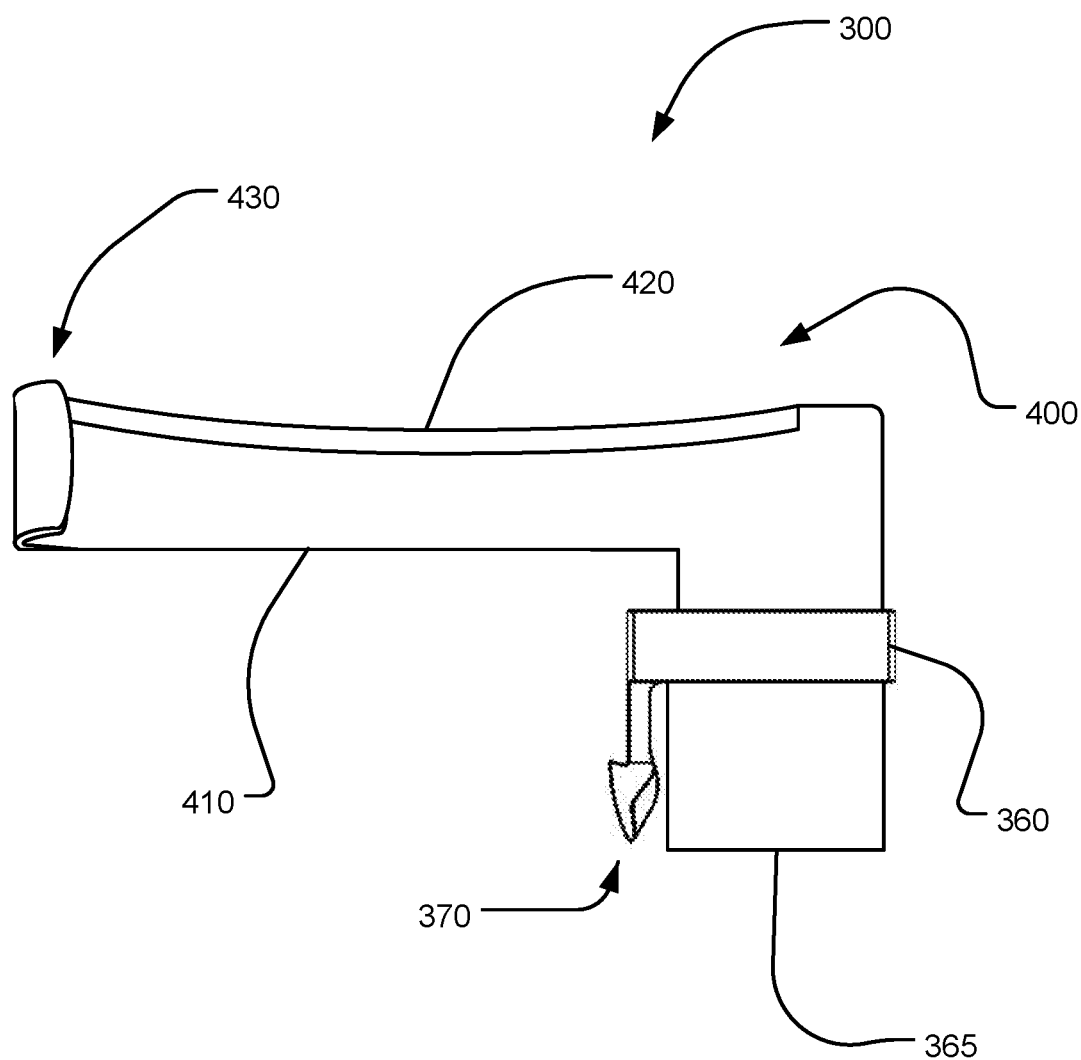
FIG. 12 illustrates a side elevation view of an interchangeable tool head comprising a hoof knife mounted generally horizontally on a standard tool head base.

FIG. 12 illustrates a side elevation view of an interchangeable tool head 300 comprising a hoof knife 400 mounted generally horizontally on the standard tool head base 360. This is an example of another interchangeable tool head 300 that can be used in place of the brush head 310. In the embodiment shown in FIG. 12, the hoof knife 400 has a straight knife spine 410 and a curved cutting blade 420. The hoof knife distal end 430 is curved and shaped so as to better access and trim portions of an equine hoof. In other embodiments, other forms/shapes/curvatures for the hoof knife 400 are contemplated.

Note that in this embodiment, the hoof knife 400 extends horizontally, generally parallel with the tool head base 360. This configuration can be particularly useful for certain cutting tasks and may be preferred by various users over the more angled or vertical blade configurations shown in other FIGs.

Figure 13:
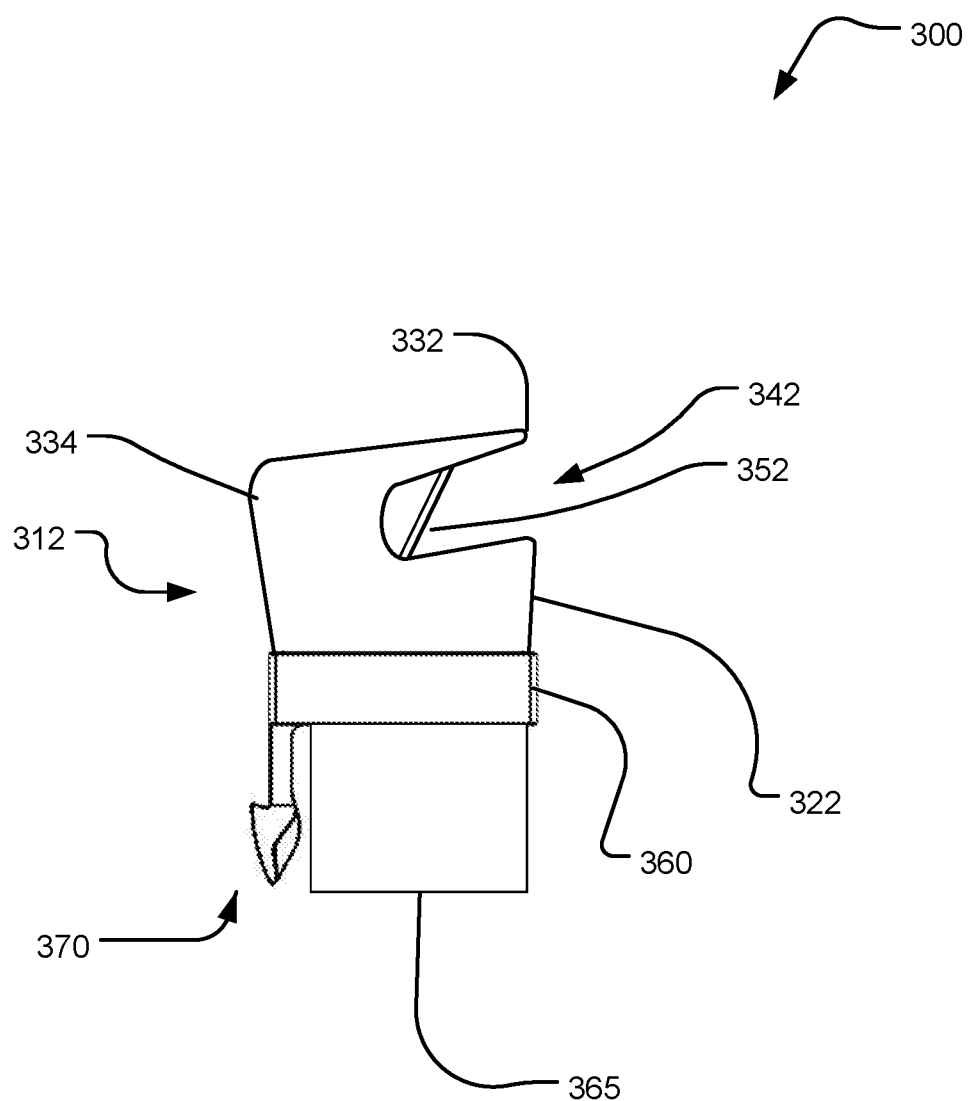
FIG. 13 illustrates a side elevation view of a twine cutter head for an exemplary embodiment of an enhanced equine tool.

FIG. 13 illustrates a side elevation view of a twine cutter head 312 for an exemplary embodiment of an enhanced equine tool. The twine cutter head 312 is an example of another interchangeable tool head 300 that can be used in place of the brush head 310. It is important to understand that as the tool heads 300 wear out, are broken, become lost, etc., they can be quickly and easily replaced in the enhanced equine tool. Furthermore, because the tool heads 300 are modular, they can be easily swapped with future tool heads as they are developed.

The twine cutter head 312 shown in FIG. 13 is useful for cutting the twine that binds hay and straw bales or any other type of string, twine, rope, ribbon, etc. that can fit within the jaw 342 of the cutter head 312. As used herein, "twine" encompasses any string-type or rope-type material. Additionally, ribbons or other decorations are often woven or tied into horse manes and/or tails, and the cutter head 312 can be used to cut such additional "twine".

The twine cutter head 312 has the standard base components of interchangeable tool heads 300, including: the tool head base 360, the interchangeable tool head support pylon 365, and the locking catch 370. However, instead of a plurality of bristles extending up from the tool head base 360, a cutter head 312 extends upwards in its place. The cutter head 312 has a front face 322, a safety jaw 342, a cutting blade 352, a jaw probe 332, and a rear face 334.

The front face 322 and jaw probe 332 define the opening that is the safety jaw 342 itself. The jaw probe 332 is somewhat small and has a rounded point that is adapted to easily slide between the baling twine on a bale and the bale itself. The jaw probe 332 then guides the twine into the jaw 342 and into contact with the cutting blade 352 which cleanly slices the twine in two. The recessed nature of the cutting blade 352 within the jaw 342 keeps the blade protected and limits the items that can be cut by the blade 352 to those small enough to fit within the safety jaw 342. Thus, the cutting blade 352 is safely ensconced between the front face 322 and the jaw probe 332 such that only small items that fit within the safety jaw 342 can be cut with the cutting blade.

Figure 14:
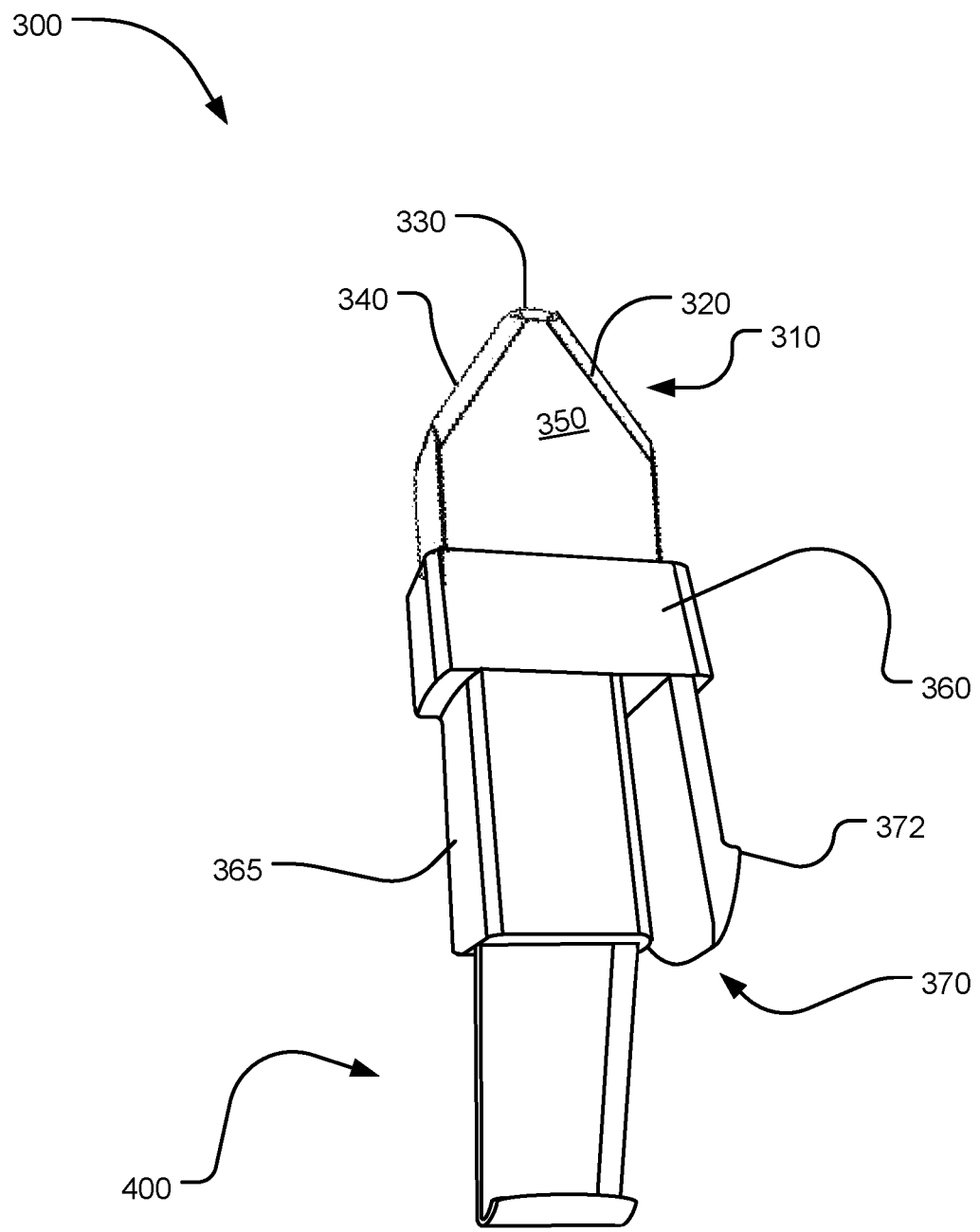
FIG. 14 illustrates a side perspective view of an interchangeable tool head that has two tools, one on each side.

FIG. 14 illustrates a side perspective view of an interchangeable tool head 300 that has two tools, one on each side. In this embodiment, the top tool is an interchangeable collateral groove brush head 310 while the bottom tool is a hoof knife 400. The top tool extends upwards from the standard tool head base 360. The bottom tool extends generally downwards from the interchangeable tool head support pylon 365. This is an example of another interchangeable tool head 300 that can be used in place of the standard single brush head as illustrated earlier.

Note that in this embodiment, the hoof knife 400 has a sharp cutting surface that faces rearward when the tool head is installed in the handle 200. In other embodiments, the cutting surface can face forwards when installed.

The hoof knife 400 is a farrier tool; however, there are many horse owners who are doing their own barefoot trimming and the hoof knife can be very helpful in such instances. With a single enhanced equine tool held in one hand, the user can (1) use the pick to pick and clean the hoof, prying out stones, etc., as needed; (2) use the brush tool to brush dirt, mud, debris, etc., from the hoof and clean it so that the user can inspect the hoof for damage; and (3) use the hoof knife 400 to shave/remove hoof material as needed. When a horse's frog is shedding, instead of leaving the piece that is waiting to peel away for the next time the farrier comes, the user can now simply cut it off using the hoof knife tool that she is already holding in her hand. The advantages of having multiple tools, properly positioned and configured, and ready to go in a user's hand can not be over-stated as the person's other hand is busy holding the horse's hoof off of the ground. If the user has to drop the hoof so that he or she can switch tools, it may be extremely difficult or impossible to get the hoof picked back up and go back to work on it after securing the needed tool. Furthermore, because the tool heads can be customized and positioned in either side of the tool mount, the user can configure the brush on the same side as the pick (for example), and the knife on the backside. This allows the user to pick and brush the hoof without turning the tool over or otherwise twisting or contorting her arm/wrist. Then, once the hoof is clean, the hoof knife tool can be employed, again without turning the tool over or otherwise twisting or contorting the arm/wrist. This is a huge advantage over known tools.

Sometimes, a user grabs only their standard old-style hoof pick, thinking this is the only tool they need. But then, after finally getting the horse positioned and holding up the hoof to be worked on, he or she will realize that they need a brush, hoof knife, or other implement. Because they only have a prior art hoof pick in hand, they must either make do with it, forgo the task necessitating the other tool(s), or drop the hoof and go and retrieve one or more other tools and then pick the hoof back up and get everything repositioned to do the other task(s). Since this is exhausting and, depending on the level of cooperation of the horse, might not even be possible, especially for all four hooves, much basic hoof picking, brushing, cleaning, scraping, filing, and shaving work goes undone. In one example, if a hoof isn't properly cleaned and trimmed, bacteria can gather in a spot and can cause serious hoof damage, potentially threatening the horses health and life. Thus, since the present invention provides a single tool which can accomplish two, three, or even more tasks without changing tools, it can literally be a life saver.

Figure 15:
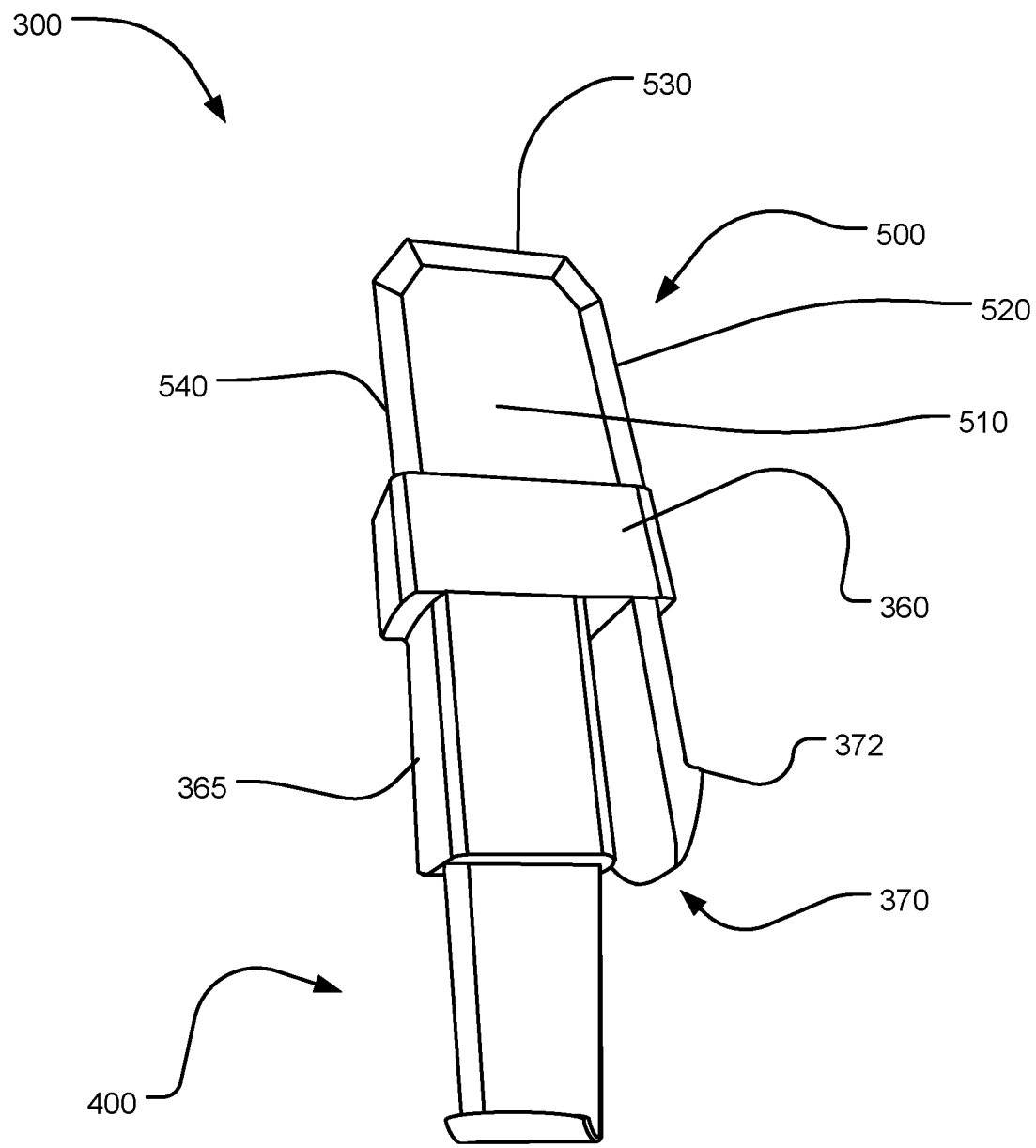
FIG. 15 illustrates a side perspective view of an interchangeable tool head that has two tools, one on each side.

FIG. 15 illustrates a side perspective view of an interchangeable tool head 300 that has two tools, one on each side. In this embodiment, the top tool is an interchangeable scraper head 500 while the bottom tool is a hoof knife 400. In other embodiments, a scraper head 500 can be paired with a brush head 310 or any other interchangeable tool head. Similarly, other configurations of brushes, hoof knives, etc. are contemplated and can be paired with the scraper head 500.

The top tool scraper head extends upwards from the standard tool head base 360. In other configurations, the scraper head can extend at an angle or even can be positioned generally horizontally similar to the knife blade in FIG. 12. The bottom tool extends generally downwards from the interchangeable tool head support pylon 365. This is an example of another interchangeable tool head 300 that can be used in place of the standard single brush head as illustrated earlier.

The scraper head 500 is shown with rounded off corners and with a thick central portion 510. The edge portions 520, 530, and 540 are narrower than the central portion 510 and although not as sharp as a cutting surface of a knife, they can be sharp enough to facilitate the scraping of mud and other extremely stuck-on materials from the hoof of an equine.

Note that in this embodiment, the hoof knife 400 has a sharp cutting surface that faces forward when the tool head is installed in the handle 200. In other embodiments, the cutting surface can face rearward when installed.

Figure 16:
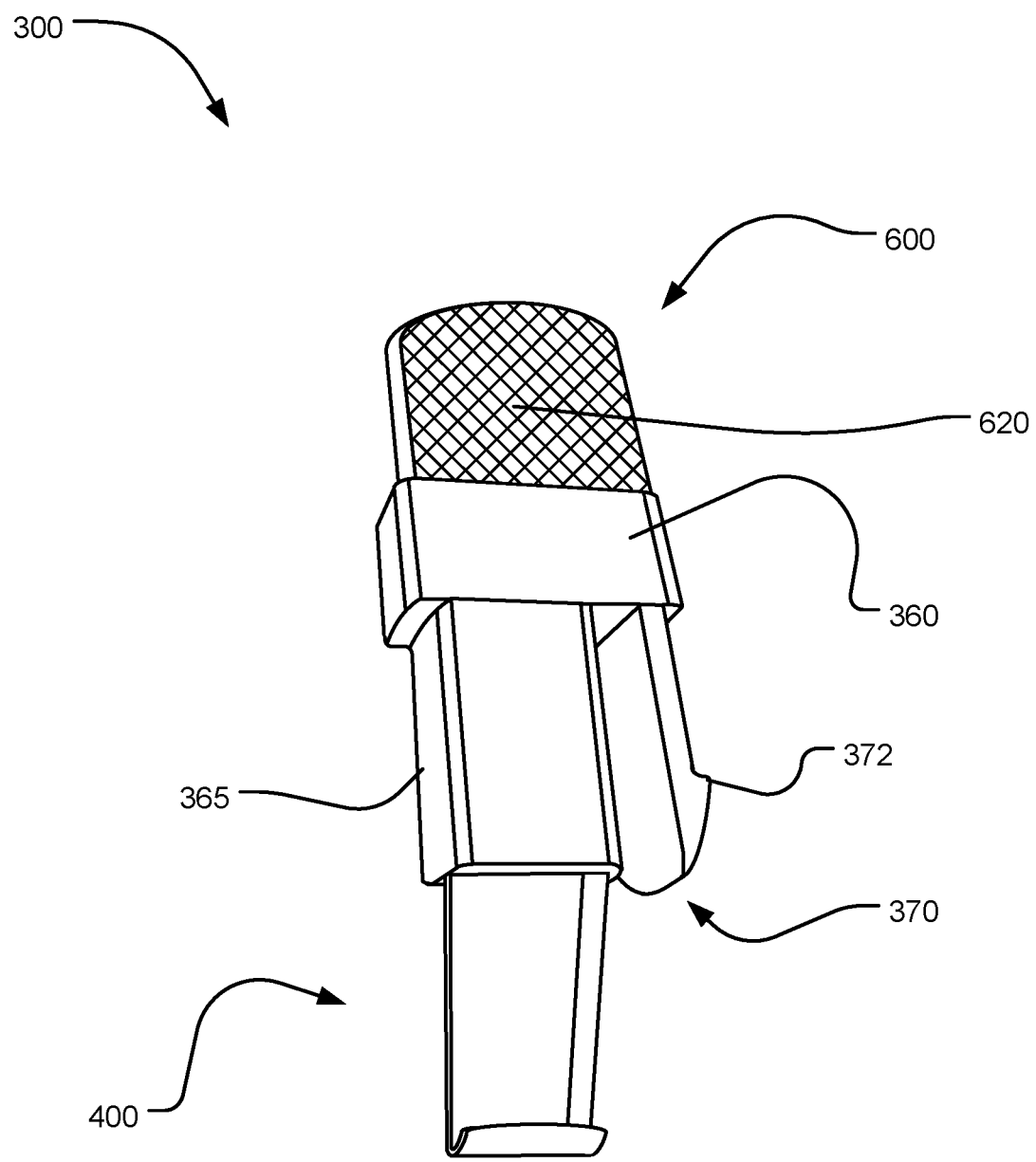
FIG. 16 illustrates a side perspective view of an interchangeable tool head that has two tools, one on each side.

FIG. 16 illustrates a side perspective view of an interchangeable tool head 300 that has two tools, one on each side. In this embodiment, the top tool is an interchangeable rasp head 600 while the bottom tool is a hoof knife 400. In other embodiments, a rasp head 600 can be paired with a brush head 310, a scraper head 500 or any other interchangeable tool head. Similarly, other configurations of brushes, hoof knives, etc. are contemplated and can be paired with the rasp head 600.

The top tool rasp head 600 extends upwards from the standard tool head base 360. In other configurations, the rasp head 600 can extend at an angle or even can be positioned generally horizontally similar to the knife blade in FIG. 12. The bottom tool extends generally downwards from the interchangeable tool head support pylon 365. This is an example of another interchangeable tool head 300 that can be used in place of the standard single brush head as illustrated earlier.

The rasp head 600 is shown with rounded off corners, in other configurations, other shapes and types of rasps/files are contemplated. The rasp surface 620 is shown on the visible flat surface. On the back side, a different/more coarse or a finer rasp or file surface can be employed as desired.

The scraper can be used to scrape mud off the front of the hoof wall as well as the sole of the hoof. It is useful to scrape the mud and debris off the hoof wall to be sure there aren't any cracks or chips that a user may want to address. If there is a chip and the edges aren't filed, it frequently can chip again (or even crack) causing more damage to the hoof. One can scrape from the top of the hoof wall (just below the hairline) down toward the ground or sideways across the hoof wall. With the scraper facing the same direction as the pick, a user is able to maintain the same grip on the handle used to pick out the hoof. If the scraper tool is attached facing the other direction, it may be easier for the user to scrape the mud in an upward motion, which at times may be the easiest way to dislodge a particular clump of dry hard mud.

Regularly cleaning the hoof is important as it allows the opportunity to possibly catch early signs of an infection or abscess. This is an important advantage of having a scraper, pick and brush in one hand, especially to clean the softer areas such as the frog.

For the rasp, facing the opposite direction of the pick may for many, provide greater leverage. A user can lay the rasp over a crack in a hoof and while pushing down, rasp away from your body, and the horse's hoof, repetitively until the sharp edges are eliminated. A user can continue to have the same hold on the handle used to pick out the hoof.

Figure 17:
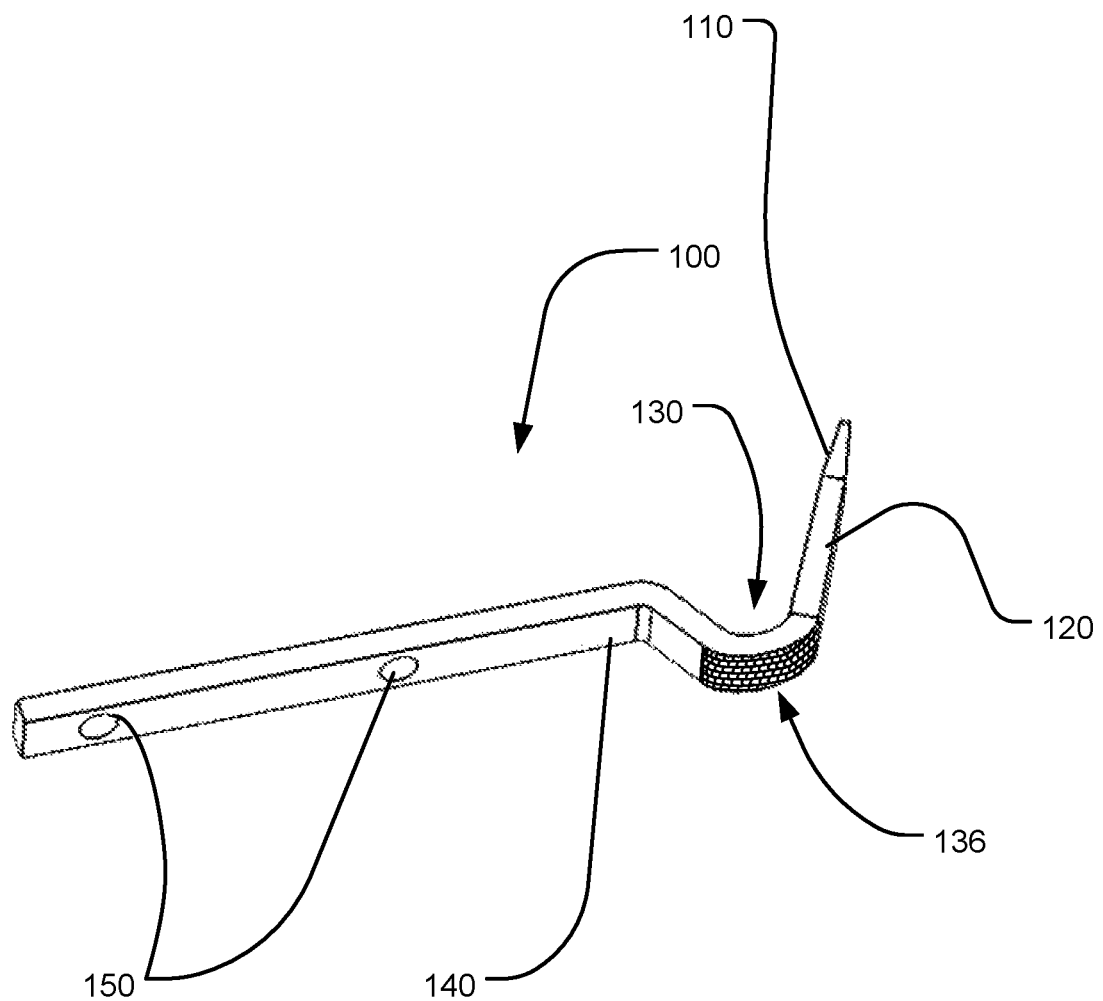
FIG. 17 illustrates a side perspective view of an exemplary enhanced pick tool.

FIG. 17 illustrates a side perspective view of an exemplary enhanced pick tool 100. Note that in this embodiment, the enhanced pick tool 100 includes a rasp/file surface 136 on the back side of the flex fulcrum 130. This allows the user to perform a quick and easy rasping/filing action without requiring the rasp tool head to be inserted into the handle. Indeed, the user can employ a brush and knife combo tool in the interchangeable tool mount and have the capability to also rasp and pick as needed—four important functions all with a single enhanced equine tool. And again, all four tasks can be completed without changing tools, dropping the hoof, switching hands, changing hand positions, contorting the wrist/arm, etc.

Figure 18A:
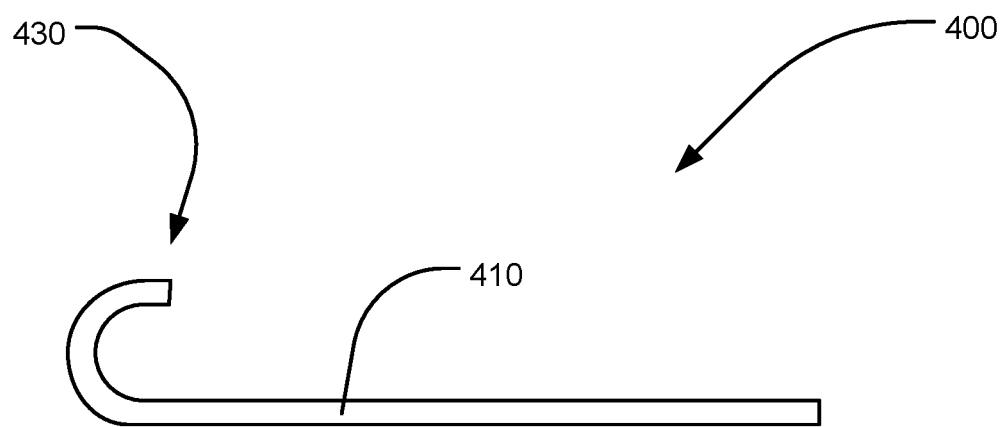
FIG. 18A illustrates a side perspective view of an exemplary hoof knife.

FIG. 18A illustrates a side perspective view of an exemplary hoof knife 400. Note that in this embodiment, the spine 410 of the hoof knife is straight and the entire blade is also straight, except for the hoof knife distal end 430 which is curved as before. Some users may prefer this configuration. Other users may prefer that shown in FIG. 18B.

Figure 18B:
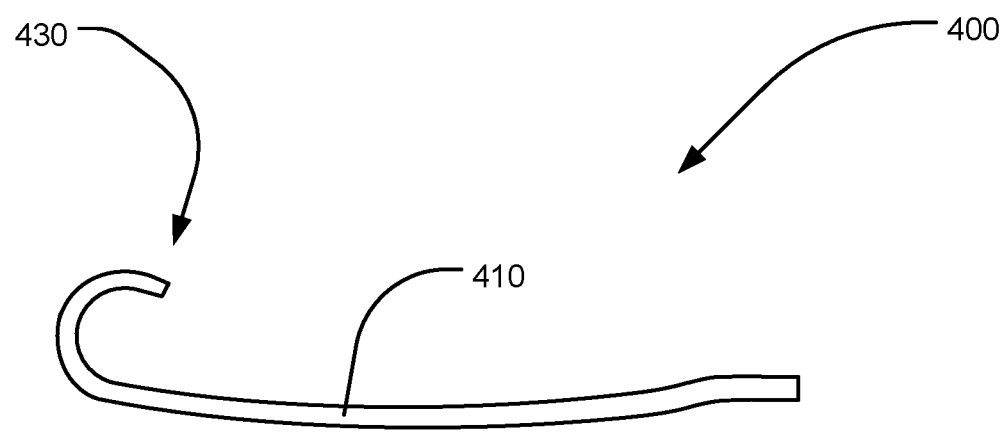
FIG. 18B illustrates a side perspective view of an exemplary hoof knife.

FIG. 18B illustrates a side perspective view of an exemplary hoof knife 400. Note that in this embodiment, the spine 410 of the hoof knife is curved and the entire blade is also curved. Some users may prefer this configuration. Other users may prefer that shown in FIG. 18A. In yet other embodiments, other configurations are contemplated.

While particular embodiments of the invention have been described and disclosed in the present application, it should be understood that any number of permutations, modifications, or embodiments may be made without departing from the spirit and scope of this invention. Accordingly, it is not the intention of this application to limit this invention in any way except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above "Detailed Description" section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise embodiment or form disclosed herein or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

In light of the above "Detailed Description," the Inventor may make changes to the invention. While the detailed description outlines possible embodiments of the invention and discloses the best mode contemplated, no matter how detailed the above appears in text, the invention may be practiced in a myriad of ways. Thus, implementation details may vary considerably while still being encompassed by the spirit of the invention as disclosed by the inventor. As discussed herein, specific terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

The above specification, examples and data provide a description of the structure and use of exemplary implementations of the described articles of manufacture and methods. It is important to note that many implementations can be made without departing from the spirit and scope of the invention.

What is claimed is:

1. An enhanced equine tool, comprising:
a pick tool having an extended horizontal attachment shaft that extends longitudinally along a horizontal line to a flex fulcrum;
the flex fulcrum curving downwards below the horizontal line before curving back to the horizontal line and then continuing up, past the horizontal line;
a pick extension extending upwards from the flex fulcrum, the pick extension having a center line which extends within a vertical plane, said vertical plane containing the horizontal line and extending upwards and downwards therefrom;
the pick extension terminating at a pick tip, the pick extension extending the pick tip above the horizontal attachment shaft;
the pick tip terminating at a point end;
the flex fulcrum acting as a fulcrum so that the pick tip can be used to pry debris out of an equine's hoof;
the extended horizontal attachment shaft extending longitudinally into a grip handle;
the grip handle extending longitudinally from a grip handle pick end to a grip handle interchangeable tool end;
the grip handle attached to the pick tool with the pick tool extending longitudinally out of the grip handle pick end;
the grip handle pick end having a pick transition piece that transitions gradually from a first outside perimeter of the extended horizontal attachment shaft of the pick tool to a larger outside perimeter of the grip handle;
a transition ring attached to the pick transition piece and having a first average diameter;
the grip handle comprising the pick transition piece, the transition ring, a first finger stop, a palm grasp, a second finger stop, and an interchangeable tool mount;
the first finger stop attached to the transition ring and having a second average diameter such that at least one of a user's two outside fingers can wrap around and securely hold the first finger stop;
the palm grasp attached to the first finger stop and having a third average diameter such that the user's middle two fingers and palm can wrap around and securely hold the palm grasp;
the second finger stop attached to the palm grasp and having a fourth average diameter such that the user's remaining outside finger can wrap around and securely hold the second finger stop;
the grip handle interchangeable tool end comprising the interchangeable tool mount attached to the second finger stop and having a fifth average diameter;

the interchangeable tool mount comprising a tool port inset into the grip handle and opening both upwards from the grip handle and downwards from the grip handle, the tool port accepting therein, one at a time, a plurality of interchangeable tool heads;

the interchangeable tool mount further comprising a bottom slot and a receiving port adjacent to the bottom slot;

each of the plurality of interchangeable tool heads comprising a tool head base configured to snugly fit within the tool port, and further comprising a support pylon configured to snugly fit within the bottom slot and a locking catch configured to slide into the receiving port;

each of the plurality of interchangeable tool heads further comprising a top tool and a bottom tool, wherein the top tool extends upwards from the tool head base and the bottom tool extends downwards from the support pylon;

the top tool selected from one of a collateral groove brush head, a hoof knife, a twine cutter head, a scraper head, and a rasp head;

the bottom tool selected from one of a collateral groove brush head, a hoof knife, a twine cutter head, a scraper head, and a rasp head;

the interchangeable tool mount positioned so that the user can selectively install any one of the plurality of interchangeable tool heads therein, the user selecting between:

(1) installing one of the plurality of interchangeable tool heads such that the top tool of the one of the plurality of interchangeable tool heads extends vertically upwards from the grip handle in the same vertical plane as the pick extension such that the user can switch back and forth between employing on the equine's hoof the pick end and a working end of the top tool of whichever interchangeable tool head is inserted within the interchangeable tool mount without changing the grip of the user's hand on the tool and without twisting the user's wrist; and (2) installing one of the plurality of interchangeable tool heads such that the top tool of the interchangeable tool head extends vertically downwards from the grip handle in the same vertical plane as the pick extension; and an interchangeable tool mount lock releasably locking the plurality of interchangeable tool heads, one at a time, into the interchangeable tool mount, wherein a locking lip on the locking catch of the interchangeable tool heads releasably engages a locking shelf in the interchangeable tool mount to secure the interchangeable tool heads.

2. The enhanced equine tool of claim 1, further comprising:

wherein the top tool is the interchangeable collateral groove brush head; the brush head comprising a plurality of brush bristles having bristle bases and bristle tops, the bristle bases attached to the tool head base;

the tool head base interchangeably attaching to the tool mount such that the tool mount holds and securely supports the tool head base;

the bristle tops forming an inverted V shape such that the plurality of brush bristles increases in length from shorter outside bristles to longer center bristles, the plurality of brush bristles thereby able to efficiently clean a collateral groove on the hoof; and the plurality of brush bristles comprises stiff, coarse bristles that are useful for efficiently cleaning grooves in the hoof.

3. The enhanced equine tool of claim 2, wherein the extended horizontal attachment shaft extends horizontally within the pick transition piece, the transition ring, the first finger stop, and the palm grasp.

4. The enhanced equine tool of claim 1, wherein the extended horizontal attachment shaft extends horizontally within at least the pick transition piece, the transition ring, the first finger stop, and the palm grasp.

5. The enhanced equine tool of claim 4, wherein the pick tip is formed to approximate a flat bladed screwdriver tip.

6. The enhanced equine tool of claim 1, wherein the pick tip is formed to approximate a flat bladed screwdriver tip.

7. The enhanced equine tool of claim 1, wherein the flex fulcrum resiliently flexes when placed under a load.

8. The enhanced equine tool of claim 1, wherein the bottom tool is the hoof knife.

9. The enhanced equine tool of claim 1, wherein the first average diameter is larger than the second average diameter, and the third average diameter is larger than the second average diameter, and the fourth average diameter is smaller than the third average diameter, and the fifth average diameter is larger than the fourth average diameter.

10. The enhanced equine tool of claim 1, further comprising:

wherein the bottom tool is the twine cutter head;

the twine cutter head comprises a front face and a jaw probe;

the front face and jaw probe defining an opening that forms a safety jaw;

the safety jaw containing a cutting blade therein;

the safety jaw having the cutting blade safely ensconced between the front face and the jaw probe such that only small items that fit within the safety jaw can be cut with the cutting blade; and wherein the jaw probe comprises a rounded point that easily slides between baling twine and a bale such that the baling twine is guided into the safety jaw where the cutting blade can cut the twine.

11. An enhanced equine tool, comprising:

a pick tool having an extended horizontal attachment shaft that extends longitudinally along a horizontal line to a flex fulcrum;

the flex fulcrum curving downwards below the horizontal line before curving back to the horizontal line and then continuing up, past the horizontal line;

a pick extension extending upwards from the flex fulcrum, the pick extension having a center line which extends within a vertical plane, said vertical plane containing the horizontal line and extending upwards and downwards therefrom;

the pick extension terminating at a pick tip, the pick extension extending the pick tip above the horizontal attachment shaft;

the pick tip terminating at a point end;

the flex fulcrum acting as a fulcrum so that the pick tip can be used to pry debris out of an equine's hoof;

the extended horizontal attachment shaft extending longitudinally into a grip handle;

the grip handle extending longitudinally from a grip handle pick end to a grip handle interchangeable tool end;

the grip handle attached to the pick tool with the pick tool extending longitudinally out of the grip handle pick end;

the grip handle pick end having a pick transition piece that transitions gradually from a first outside perimeter of the extended horizontal attachment shaft of the pick tool to a larger outside perimeter of the grip handle;

a transition ring attached to the pick transition piece and having a first average diameter;

the grip handle comprising the pick transition piece, the transition ring, a first finger stop, a palm grasp, a second finger stop, and an interchangeable tool mount;

the first finger stop attached to the transition ring and having a second average diameter, the first finger stop adapted such that at least one of a user's two outside fingers can wrap around and securely hold the first finger stop;

the palm grasp attached to the first finger stop and having a third average diameter, the palm grasp adapted such that the user's middle two fingers and palm can wrap around and securely hold the palm grasp;

the second finger stop attached to the palm grasp and having a fourth average diameter, the second finger stop adapted such that the user's remaining outside finger can wrap around and securely hold the second finger stop;

the grip handle interchangeable tool end comprising the interchangeable tool mount attached to the second finger stop and having a fifth average diameter;

the interchangeable tool mount comprising a tool port inset into the grip handle and opening both upwards from the grip handle and downwards from the grip handle, the tool port accepting therein, one at a time, a plurality of interchangeable tool heads each of which has a tool base;

the tool head base interchangeably attaching to the tool mount such that the tool mount holds and securely supports the tool head base;

an interchangeable tool head comprising a support pylon extending downwards from the tool head base and snugly fitting within a bottom slot, the bottom slot configured within the tool mount and receiving therein the interchangeable tool head support pylon and providing support thereto;

the interchangeable tool head further comprising a locking catch extending downwards from the interchangeable tool head base configured to slide into a receiving port adjacent the bottom slot, and the locking catch releasably engages the tool mount to retain the interchangeable tool head inside the tool mount;

each of the plurality of interchangeable tool heads further comprising a top tool and a bottom tool, wherein the top tool extends upwards from the tool head base and the bottom tool extends downwards from the support pylon;

the top tool selected from one of a collateral groove brush head, a hoof knife, a twine cutter head, a scraper head, and a rasp head;

the bottom tool selected from one of a collateral groove brush head, a hoof knife, a twine cutter head, a scraper head, and a rasp head;

the interchangeable tool mount positioned so that the user can selectively install any one of the plurality of interchangeable tool heads therein, the user selecting between:

(1) installing one of the plurality of interchangeable tool heads such that the top tool of the interchangeable tool head extends vertically upwards from the grip handle in the same vertical plane as the pick extension such that the user can switch back and forth between employing on the equine's hoof the pick end and a working end of the top tool of whichever interchangeable tool head is inserted within the interchangeable tool mount without changing the grip of the user's hand on the tool and without twisting the user's wrist; and (2) installing one of the plurality of interchangeable tool heads such that the top tool of the interchangeable tool head extends vertically downwards from the grip handle in the same vertical plane as the pick extension; and an interchangeable tool mount lock releasably locking the plurality of interchangeable tool heads, one at a time, into the interchangeable tool mount, wherein a locking lip on the locking catch of the interchangeable tool heads releasably engages a locking shelf in the interchangeable tool mount to secure the interchangeable tool heads.

12. The enhanced equine tool of claim 11, further comprising:

wherein the top tool is the interchangeable collateral groove brush head; the brush head comprising a plurality of brush bristles having bristle bases and bristle tops, the bristle bases attached to the tool head base;

the bristle tops forming an inverted V shape such that the plurality of brush bristles increases in length from shorter outside bristles to longer center bristles, the plurality of brush bristles thereby able to efficiently clean a collateral groove on the hoof; and the plurality of brush bristles comprises stiff, coarse bristles that are useful for efficiently cleaning grooves in the hoof; and wherein the extended horizontal attachment shaft extends horizontally within at least the pick transition piece, the transition ring, the first finger stop, and the palm grasp.

13. The enhanced equine tool of claim 12, wherein the pick tip is formed to approximate a flat bladed screwdriver tip.

14. The enhanced equine tool of claim 13, wherein the bottom tool is the scraper head.

15. The enhanced equine tool of claim 14, wherein the first average diameter is larger than the second average diameter, and the third average diameter is larger than the second average diameter, and the fourth average diameter is smaller than the third average diameter, and the fifth average diameter is larger than the fourth average diameter.

16. The enhanced equine tool of claim 12, wherein the bottom tool is the hoof knife.

17. The enhanced equine tool of claim 16, wherein the first average diameter is larger than the second average diameter, and the third average diameter is larger than the second average diameter, and the fourth average diameter is smaller than the third average diameter, and the fifth average diameter is larger than the fourth average diameter.

18. The enhanced equine tool of claim 12, further comprising:

wherein the bottom tool is the rasp head.

19. The enhanced equine tool of claim 11, wherein the pick tip is formed to approximate a flat bladed screwdriver tip.

20. The enhanced equine tool of claim 11, further comprising:

wherein the top tool is the collateral groove brush head and the bottom tool is the twine cutter head;

the twine cutter head comprises a front face and a jaw probe;

the front face and jaw probe defining an opening that forms a safety jaw;

the safety jaw having the cutting blade safely ensconced between the front face and the jaw probe such that only small items that fit within the safety jaw can be cut with the cutting blade; and wherein the jaw probe comprises a rounded point that easily slides between baling twine and a bale such that the baling twine is guided into the safety jaw where the cutting blade can cut twine.

* * * * *